US012565164B2

(12) United States Patent
Teranishi et al.

(10) Patent No.: US 12,565,164 B2
(45) Date of Patent: Mar. 3, 2026

(54) POWER SUPPLY SYSTEM AND METHOD FOR CONTROLLING POWER SUPPLY SYSTEM

(71) Applicant: Nissan Motor Co., Ltd., Kanagawa (JP)

(72) Inventors: Akira Teranishi, Kanagawa (JP); Jun Ishizuki, Kanagawa (JP); Jaesun Hur, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/713,955

(22) PCT Filed: Nov. 28, 2022

(86) PCT No.: PCT/JP2022/043783
§ 371 (c)(1),
(2) Date: May 28, 2024

(87) PCT Pub. No.: WO2023/095909
PCT Pub. Date: Jun. 1, 2023

(65) Prior Publication Data
US 2025/0026286 A1 Jan. 23, 2025

(30) Foreign Application Priority Data

Nov. 29, 2021 (JP) ................................. 2021-193400
Nov. 29, 2021 (JP) ................................. 2021-193413
Nov. 29, 2021 (JP) ................................. 2021-193431

(51) Int. Cl.
B60R 16/033 (2006.01)
H02J 1/08 (2006.01)
H02J 7/34 (2006.01)

(52) U.S. Cl.
CPC ............ B60R 16/033 (2013.01); H02J 1/084 (2020.01); H02J 7/34 (2013.01)

(58) Field of Classification Search
CPC ....... B60R 16/033; B60R 16/02; B60R 16/03; H02J 1/084; H02J 7/34; H02J 2310/46; H02J 1/00; H02J 7/00; H02J 7/1423
See application file for complete search history.

(56) References Cited

U.S. PATENT DOCUMENTS

2021/0237670 A1 8/2021 Takahara
2021/0402939 A1* 12/2021 Obayashi .............. B60R 16/033
2022/0144192 A1 5/2022 Ishihara

FOREIGN PATENT DOCUMENTS

JP 2013095181 A * 5/2013
JP 2017-177857 A 10/2017
(Continued)

*Primary Examiner* — Lincoln D Donovan
*Assistant Examiner* — Alex W Lam
(74) *Attorney, Agent, or Firm* — Osha Bergman Watanabe & Burton LLP

(57) ABSTRACT

A power supply system is installed in a vehicle having an autonomous driving mode. The power supply system includes a first load circuit connected to a first load that operates using electric power from a main battery; a second load circuit connected to a second load that operates using electric power from the main battery or an additional battery and is necessary for the autonomous driving mode; and a main relay provided on a power supply line for electrically connecting the first load and the second load. The first load circuit is located on an upstream side of the main relay. A branch point on a downstream side of the main relay defines a first path and a second path and allows a current flowing from the branch point to the second load by the first path and to the additional battery by the second path.

8 Claims, 10 Drawing Sheets

(56)        References Cited

FOREIGN PATENT DOCUMENTS

| JP | 2020-040504 | A | 3/2020 |
| JP | 2020-117063 | A | 8/2020 |
| JP | 2020-150725 | A | 9/2020 |
| JP | 2021-125928 | A | 8/2021 |

* cited by examiner

POWER SUPPLY SYSTEM AND METHOD FOR CONTROLLING POWER SUPPLY SYSTEM

TECHNICAL FIELD

The present invention relates to a power supply system and a method for controlling the power supply system.

This application claims priority to Japanese Patent Applications No. 2021-193413, No. 2021-193400, and No. 2021-193431, all filed on Nov. 29, 2021, and for designated countries that allow incorporation by reference, the contents of these applications are herein incorporated by reference and made a part of the description of this application.

BACKGROUND ART

There is known a conventional device for controlling an autonomous vehicle power supply that has a circuit connection/disconnection mechanism between a first load circuit that uses a main battery as a power source and a second load circuit that uses an additional battery as a power source (Patent Document 1). The first load circuit is connected to a load necessary to continue a normal driving mode by a driver, and the second load circuit is connected to an autonomous function load necessary to continue an autonomous driving mode and to maintain a voltage. In this method for controlling an autonomous vehicle power supply, when it is determined that electric power is to be drawn from the additional battery to the first load circuit side based on a load state detected on the second load circuit side while the circuit connection/disconnection mechanism is in a connected state, the circuit connection/disconnection mechanism enters a disconnected state.

PRIOR ART DOCUMENT

Patent Document

Patent Document 1: Japanese Unexamined Patent Application Publication No. 2017-177857

SUMMARY OF INVENTION

Problems to be Solved by Invention

In the autonomous vehicle power supply device described in Patent Document 1, the second load circuit has a configuration in which loads are connected uniformly regardless of the magnitude of a current consumed by each load. This has a problem in that sufficient voltage is not applied to the additional battery, resulting in insufficient charging of the additional battery.

A problem to be solved by the present invention is to provide a power supply system that prevents a drop in the charging voltage of an additional battery.

Means for Solving Problems

To solve the above problem, the present invention includes: a first load circuit connected to a first load; a second load circuit connected to a second load necessary to continue an autonomous driving mode; and a first circuit connection/disconnection mechanism configured to electrically connect or disconnect the first load circuit to or from the second load circuit, wherein a current path on a downstream side of the first circuit connection/disconnection mechanism includes a first path for allowing a current flowing from the first load circuit to the first circuit connection/disconnection mechanism to flow from a branch point located on the downstream side of the first circuit connection/disconnection mechanism to the second load, and a second path for allowing the current to flow from the branch point to an additional battery, and a current value allowed for conduction through the first path is higher than a current value allowed for conduction through the second path.

Effects of Invention

According to the present invention, it is possible to prevent a drop in the charging voltage of the additional battery.

MODE(S) FOR CARRYING OUT THE INVENTION

Embodiments of a power supply system and a method for controlling the power supply system according to the present invention will be described below with reference to the drawings.

First Embodiment

Figure 1:
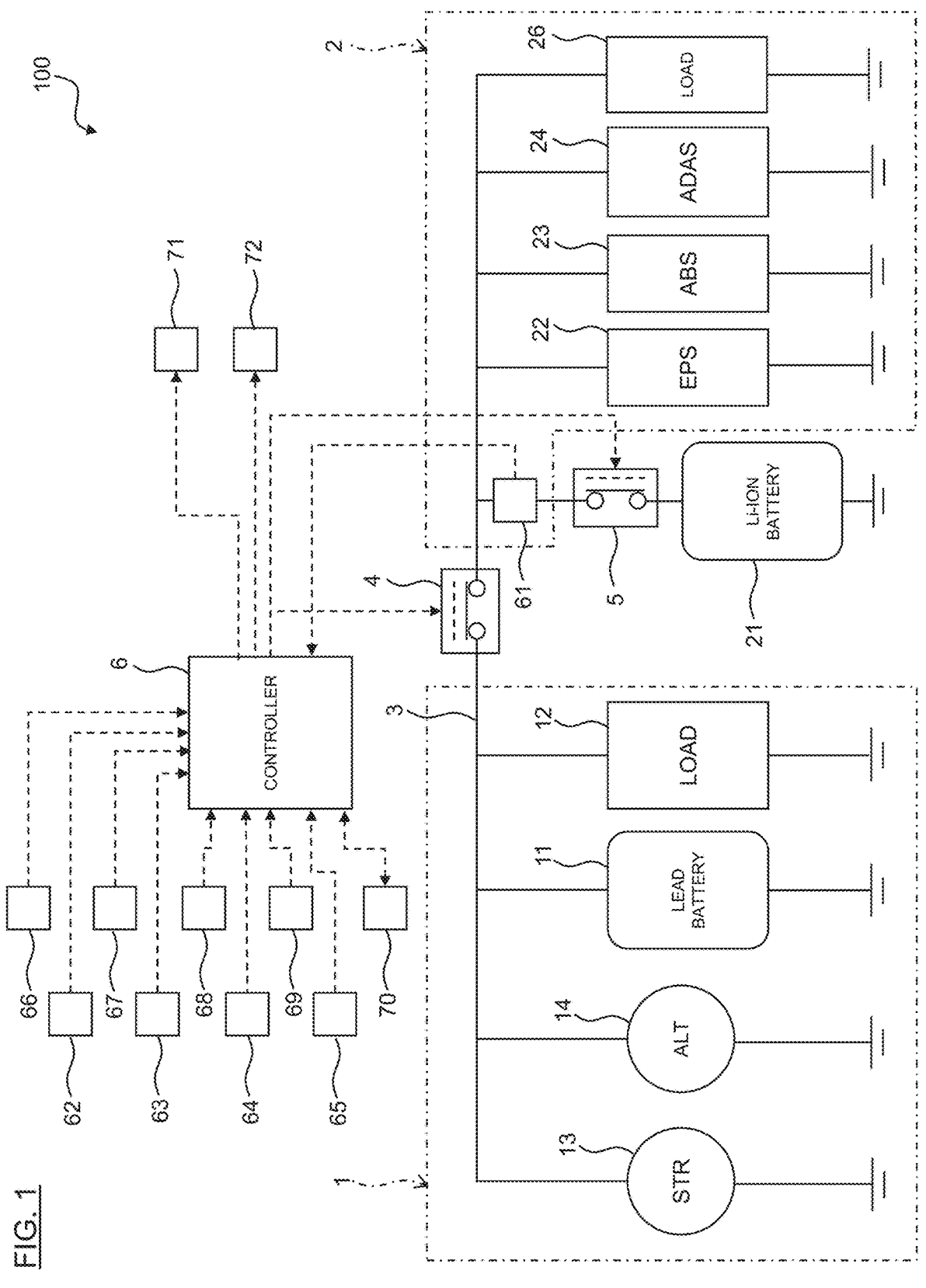
FIG. 1 is a schematic diagram of a configuration of a power supply system according to a first embodiment.

FIG. 1 is a schematic diagram of a configuration of a power supply system 100 according to the present embodiment. In the present embodiment, a vehicle in which the power supply system 100 is installed will be described using as an example a vehicle that includes an engine serving as a drive source and has an autonomous travel control function. A vehicle having an autonomous travel control function has a normal driving mode and an autonomous driving mode as driving modes. When the vehicle is set to the normal driving mode, the vehicle travels according to driving operations (steering operation, accelerator operation, brake operation, etc.) by a driver. On the other hand, when the vehicle is set to the autonomous driving mode, the vehicle travels according to a driving operation of a driver assistance device (not illustrated) in addition to the driver.

In the autonomous driving mode, the content of a driving assist provided by the autonomous travel control function may differ depending on a driving assist level. The driving assist level is a level indicating the degree of intervention when the driver assistance device assists driving of the vehicle using the autonomous travel control function. The higher the driving assist level, the lower the degree of driver's contribution to the driving of the vehicle. Specifically, the driving assist level can be set using definitions based on SAE J3016 of the Society of Automotive Engineers (SAE) and the like. In the present embodiment, the driving assist level provided by the driver assistance device will be described as driving assist level 2. Further, in the present embodiment, a vehicle having a mode (also referred to as a hands-off mode) in which the vehicle autonomously travels without the driver touching the steering wheel will be described as an example. In the hands-off mode in which the driver assistance device performs some driving tasks on behalf of the driver, the driver needs to prepare to take back driving control and manually drive in response to a request from the driver assistance device. Further, in the hands-off mode, a redundant function is required to continue autonomous travel until the driver performs a driving operation in response to a request from the driver assistance device. As an example of the redundant function, a vehicle having an autonomous driving mode, for example, is provided with an additional battery that functions as a backup power supply source for a load required for the autonomous travel control function.

However, the additional battery being mounted has a problem that the additional battery is discharged by a dark current of the load connected to the additional battery while an ignition switch of the vehicle is in an off state. As the additional battery is discharged by the dark current of the load, the remaining battery level of the additional battery decreases. This may make it impossible to supply the load with the electric power necessary to continue autonomous travel in the autonomous driving mode, resulting in the additional battery not functioning as a backup power supply source. In the power supply system and the method for controlling the power supply system according to the present invention, with a configuration and method that will be described below, it is possible to prevent the additional battery from being discharged by the dark current of the load and to supply the electric power necessary to continue autonomous travel to the load in the autonomous driving mode. Note that, hereinafter, the above-described driver assistance device will be described as a component included in an advanced driver assistance system (ADAS).

As illustrated in FIG. 1, the power supply system 100 includes a first load circuit 1, a second load circuit 2, a power supply line 3, a main relay 4, an additional relay 5, and a controller 6.

The first load circuit 1 is a load circuit that operates using electric power from a lead battery 11 (main battery) or an alternator 14, and that is connected to a first load necessary to continue the above-described normal driving mode. In the present embodiment, the first load circuit 1 includes the lead battery 11, a load actuator 12, a starter motor 13, and the alternator 14, which are connected to the power supply line 3, as illustrated in FIG. 1. Examples of the first load necessary to continue the normal driving mode include the load actuator 12 and the starter motor 13.

The lead battery 11 is a secondary battery used as a main battery that is mounted in conventional engine vehicles. The lead battery 11 is charged by the alternator 14 serving as a generator so that the remaining battery level does not decrease. The alternator 14 generates electricity using a rotational drive mechanism (not illustrated) driven by an engine, and charges the lead battery 11 so that the remaining battery level is maintained at a predetermined remaining battery level or higher.

The load actuator 12 is an auxiliary machine that operates using electric power from the lead battery 11 or electric power generated by the alternator 14. Examples of the load actuator 12 include an electric motor that drives a compressor of an air conditioner and a headlight. When an ignition switch 68 of the vehicle is on (hereinafter also referred to as a travel-ready state of the vehicle), the electric power stored in the lead battery 11 or the electric power generated by the alternator 14 is supplied to the load actuator 12. On the other hand, when the ignition switch 68 of the vehicle is off (hereinafter also referred to as a parked state of the vehicle), the electric power stored in the lead battery 11 is supplied to the load actuator 12. Note that the travel-ready state of the vehicle indicates a state that is unrelated to the vehicle speed of the vehicle, and includes a state in which the vehicle is traveling and a state in which the vehicle is stopped.

The starter motor 13 is a motor for starting the engine, which starts the engine to start the vehicle and restarts the engine from a no idling state.

The second load circuit 2 is a load circuit that operates using electric power from the lead battery 11 or a lithium ion battery 21 (additional battery), and that is connected to a second load necessary to continue the above-described autonomous driving mode. In the present embodiment, the second load circuit 2 includes an EPS actuator 22, an ABS actuator 23, an ADAS actuator 24, a load 26, and a current sensor 61, which are connected to the power supply line 3, as illustrated in FIG. 1. Examples of the second load necessary to continue the autonomous driving mode include the EPS actuator 22, the ABS actuator 23, and the ADAS actuator 24. The range of input voltage for each actuator has been defined according to the specifications of the actuator, and in order for the actuator to continue to operate according to the specifications, the input voltage for the actuator needs to be kept within the range of the input voltage defined by the specifications.

The lithium ion battery 21 is a secondary battery added as a new power source to a power source provided by the lead battery 11 to continue the autonomous travel control function of the vehicle. In other words, the lithium ion battery 21 is a backup power supply source that supplies electric power to each load included in the second load circuit 2 in order to continue autonomous travel in the autonomous driving mode. Charging and discharging of the lithium ion battery 21 is controlled by a battery management system (BMS). In the example of FIG. 1, when the main relay 4 and the additional relay 5 are in an on state, the first load circuit 1 is electrically connected to the lithium ion battery 21, so that the battery management system charges the lithium ion battery 21 using the electric power generated by the alternator 14 (generator). When the controller 6 determines that the driving mode of the vehicle is the autonomous driving mode and the circuit voltage of the second load circuit 2 falls outside a predetermined voltage range, the main relay 4 switches from on to off. However, since the additional relay 5 maintains the on state, an electrically-connected state is maintained between the additional battery and the second load circuit before and after the main relay 4 switches from on to off. The battery management system outputs electric power charged in the lithium ion battery 21 to the second load to discharge the lithium ion battery 21. Once the main relay 4 switches from on to off in the autonomous driving mode, the main relay 4 maintains an off state until the driving mode changes from the autonomous driving mode to the normal driving mode, so that the lithium ion battery 21 cannot be charged using the electric power generated by the alternator 14. For this reason, the capacity of the lithium ion battery 21 is set to an appropriate capacity, for example, such that the time during which the vehicle continues to travel in the autonomous driving mode is at least a required time or longer.

Further, the lithium ion battery 21 has a characteristic of lower internal resistance than the lead battery 11. Therefore, for example, even when the EPS actuator 22 operates and consumes a large amount of current, the voltage can be maintained high.

The EPS actuator 22 is an EPS motor that generates electric assist force, and is also a load that needs to operate in the autonomous driving mode. The EPS actuator 22 is used in an electric power steering system (not illustrated) that electrically assists the force necessary for a steering operation to reduce steering force. "EPS" as used herein is an abbreviation for "Electric Power Steering".

The ABS actuator 23 is a pump motor or an electromagnetic valve that drives a hydraulic pump, and is also a load that needs to operate in the autonomous driving mode. The ABS actuator 23 includes an electric hydraulic pump, and is used in a brake hydraulic pressure control system (not illustrated) that independently controls the hydraulic pressure of each wheel cylinder based on hydraulic oil from a master cylinder and a hydraulic pump. "ABS" as used herein is an abbreviation for "Antilock Brake System".

The ADAS actuator 24 is an actuator that performs various driving operation assists to assist the driver's driving operations, and is also a load that needs to operate in the autonomous driving mode. The ADAS actuator 24 is used in an advanced driver assistance system 70.

The EPS actuator 22, the ABS actuator 23, and the ADAS actuator 24 are loads that are necessary for traveling in the autonomous driving mode. On the other hand, the load 26 is a load that is not necessary for traveling in the autonomous driving mode. Further, the current consumed by the load 26 is smaller than the current consumed by the load such as the EPS actuator 22 that is necessary for traveling in the autonomous driving mode. An example of the load 26 is an externally communicating device.

The power supply line 3 is a wire harness that electrically connects the first load circuit 1 and the second load circuit 2 to supply electric power. Electric power is supplied to the load actuator 12, which is included in the first load circuit 1, and the EPS actuator 22, the ABS actuator 23, and the ADAS actuator 24, which are included in the second load circuit 2, via the power supply line 3.

The main relay 4 (first circuit connection/disconnection mechanism) is a circuit connection/disconnection mechanism that is provided on the power supply line 3 between the first load circuit 1 and the second load circuit 2 to electrically connect or disconnect the first load circuit 1 to or from the second load circuit 2. One terminal of the main relay 4 is connected to the power supply line 3 on the first load circuit 1 side, and the other terminal of the main relay 4 is connected to the power supply line 3 on the second load circuit 2 side. In the present embodiment, a normally open type of relay is used as the main relay 4. Examples of the main relay 4 include a mechanical relay (also referred to as a mechanical relay) and a semiconductor relay. A mechanical relay has contacts and is switched on and off by mechanically opening and closing the contacts using electromagnetic action. A semiconductor relay does not have contacts, is composed of a semiconductor, such as a metal-oxide-semiconductor field-effect transistor (MOSFET), and electronic components, and is switched on and off by an electrical signal. In the present embodiment, the main relay 4 will be described using as an example a semiconductor relay having a self-disconnection/connection function that autonomously switches on and off for overvoltage protection and overcurrent protection.

An opening/closing control signal is input from the controller 6 to the main relay 4, and the main relay 4 is turned on or off according to the input opening/closing control signal. In addition to the opening/closing control signal, a connection maintaining command or a cancellation command is input from the controller 6 to the main relay 4. Once the connection maintaining command is received, the main relay 4 continues to maintain the on state until the cancellation command is received, regardless of whether the opening/closing control signal is received. When the cancellation command is received after the connection maintaining command is received, the main relay 4 cancels the on state being maintained and is turned on or off again according to the opening/closing control signal. In a case where the main relay 4 is a semiconductor relay as in the present embodiment, the opening/closing control signal is, for example, a switching signal for switching a semiconductor, such as a switching element, from on to off or from off to on. Further, the connection maintaining command is a signal for disabling the self-disconnection/connection function to maintain the on state, for example, in order to prevent the main relay 4 from being switched from on to off by the self-disconnection/connection function. Further, the cancellation command is, for example, a signal for enabling the self-disconnection/connection function. Examples of the self-disconnection/connection function include a protection function that switches the main relay 4 from on to off when the voltage applied between the terminals of the main relay 4 (between the terminal connected to the first load circuit 1 and the terminal connected to the second load circuit 2) is an abnormal voltage. The abnormal voltage is, for example, a predetermined overvoltage defined by the specifications of the main relay 4. Further, examples of the self-disconnection/connection function include a protection function that switches the main relay 4 from on to off when the current flowing through the main relay 4 (the current flowing from the first load circuit 1 side to the second load circuit 2 side) is an abnormal current. The abnormal current is, for example, a predetermined overcurrent defined by the specifications of the main relay 4. Note that, in the following description, "on (on state) of the main relay 4" refers to a state where the terminals of the main relay 4 are electrically connected to each other, and "off (off state) of the main relay 4" refers to a state where the terminals of the main relay 4 are insulated (disconnected).

The additional relay 5 is a battery connection/disconnection mechanism that is electrically connected to the power supply line 3 on the second load circuit 2 side to electrically connect or disconnect the EPS actuator 22, the ABS actuator 23, and the ADAS actuator 24 to or from the lithium ion battery 21. One terminal of the additional relay 5 is connected to the lithium ion battery 21, and the other terminal of the additional relay 5 is connected to the power supply line 3 on the second load circuit 2 side via the current sensor 61. In the present embodiment, a normally closed type of relay is used as the additional relay 5. As with the main relay 4, examples of the additional relay 5 include a mechanical relay and a semiconductor relay. In the present embodiment, the additional relay 5 will be described using a mechanical relay as an example.

An opening/closing control signal is input from the controller 6 to the additional relay 5, and the additional relay 5 is turned on or off according to the input opening/closing control signal. In addition to the opening/closing control signal, a connection maintaining command or a cancellation command is input from the controller 6 to the additional relay 5. Once the connection maintaining command is received, the additional relay 5 continues to maintain the on state until the cancellation command is received, regardless of whether the opening/closing control signal is received. When the cancellation command is received after the connection maintaining command is received, the additional relay 5 cancels the on state being maintained and is turned on or off again according to the opening/closing control signal. In a case where the additional relay 5 is a mechanical relay as in the present embodiment, the opening/closing control signal is, for example, a voltage application signal for generating a magnetic field to switch the additional relay 5 from off to on, or a voltage stop signal for canceling the magnetic field to switch the additional relay 5 from on to off. Further, the connection maintaining command is, for example, a forced voltage application signal for continuing to generate a magnetic field to maintain the on state. Note that, in the following description, "on (on state) of the additional relay 5" refers to a state where the terminals of the additional relay 5 are electrically connected to each other, and "off (off state) of the additional relay 5" refers to a state where the terminals of the additional relay 5 are insulated (disconnected).

Further, in the present embodiment, the electrical connection or disconnection of the additional relay 5 according to the opening/closing control signal will be described as an example. However, the electrical connection or disconnection between the lithium ion battery 21 and each load included in the second load circuit 2 may be performed in other ways. For example, it is conceivable that the power supply system has a configuration in which a DC/DC converter is provided between the lithium ion battery 21 and the additional relay 5 and the voltage of the lithium ion battery 21 is boosted by the DC/DC converter to be output. With this configuration, since the DC/DC converter alone can function as a relay, the additional relay 5 may be electrically connected to or disconnected from the lithium ion battery 21 under the control of the DC/DC converter.

Next, the controller 6 will be described. The controller 6 is an electronic control unit (ECU) that is composed of a computer with hardware and software and includes a memory that stores a program, a CPU that executes the program stored in this memory, and the like. Note that operable circuits to be used include, instead of or together with the CPU, an MPU, a DSP, an ASIC, and an FPGA. The controller 6 implements various functions by the CPU executing programs stored in a ROM. The functions to be implemented by the controller 6 will be described later.

As illustrated in FIG. 1, various kinds of information are input from the current sensor 61, an autonomous driving mode switch 62, a first voltage sensor 63, a second voltage sensor 64, a battery voltage sensor 65, a brake switch 66, a torque sensor 67, the ignition switch 68, a vehicle speed sensor 69, and the advanced driver assistance system 70 to the controller 6. Further, the controller 6 executes processing based on input information, and outputs an opening/closing control signal, a connection maintaining command, or a cancellation command to the main relay 4 and/or the additional relay 5 based on the execution result. Furthermore, the controller 6 executes processing based on input information, and outputs a control command to a display device 71 and a buzzer 72 based on the execution result.

The current sensor 61 is provided between the main relay 4 and the additional relay 5 to detect the direction of current with respect to the lithium ion battery 21. The detection result by the current sensor 61 is output to the controller 6.

The autonomous driving mode switch 62 is a switch that can be operated by the driver and is also a switch for starting the autonomous driving mode. In a case where the driving mode of the vehicle is the normal driving mode, the autonomous driving mode is started when the driver turns on the autonomous driving mode switch 62. Further, in a case where the driving mode of the vehicle is the autonomous driving mode, the normal driving mode is started when the driver turns off the autonomous driving mode switch 62. Although the form, the installation position, and the like of the autonomous driving mode switch 62 are not particularly limited, an example of the autonomous driving mode switch 62 is a button that is provided on a steering wheel and can be operated by the driver. Information on an operation of the autonomous driving mode switch 62 by the driver is output to the controller 6 and the advanced driver assistance system 70.

The first voltage sensor 63 detects a circuit voltage of the first load circuit 1. The circuit voltage of the first load circuit 1 is a voltage of the power supply line 3 on the first load circuit 1 side. The first voltage sensor 63 is connected in parallel to each component included in the first load circuit 1, for example. The detection result by the first voltage sensor 63 is output to the controller 6. Further, as in the present embodiment, in a case where a semiconductor relay having a self-disconnection/connection function is used as the main relay 4, the detection result by the first voltage sensor 63 is also output to the main relay 4.

The second voltage sensor 64 detects a circuit voltage of the second load circuit 2. The circuit voltage of the second load circuit 2 is a voltage of the power supply line 3 on the second load circuit 2 side. The second voltage sensor 64 is connected in parallel to each load included in the second load circuit 2, for example. The detection result by the second voltage sensor 64 is output to the controller 6. Further, as in the present embodiment, in a case where a semiconductor relay having a self-disconnection/connection function is used as the main relay 4, the detection result by the second voltage sensor 64 is also output to the main relay 4.

The battery voltage sensor 65 detects a battery voltage of the lithium ion battery 21. The detection result by the battery voltage sensor 65 is output to the controller 6. The brake switch 66 detects a brake operation by the driver. Information on the brake operation by the driver detected by the brake switch 66 is output to the controller 6. The torque sensor 67 detects a steering torque applied to a steering shaft according to a steering operation by the driver. Information on the steering operation by the driver detected by the torque sensor 67 is output to the controller 6.

The ignition switch 68 is a switch for turning on or off the drive source of the vehicle. In a case of a vehicle with an engine serving as a drive source as in the present embodiment, when the ignition switch 68 is turned on, the engine is started and the vehicle enters the travel-ready state. On the other hand, when the ignition switch 68 is turned off, the engine is stopped and the vehicle enters the parked state. Examples of the type of the ignition switch 68 include an ignition key type in which an occupant turns a vehicle key inserted into a keyhole to start a vehicle, and a push button start type in which an occupant presses a button form to start a vehicle. Further, the ignition switch 68 may be provided with an indicator for starting the drive source of the vehicle (ON indicator) or an indicator for stopping the drive source of the vehicle (OFF indicator), as well as an indicator for energizing an electrical system for a car navigation system, an audio system, and the like which are not related to the travel of the vehicle (ACC indicator), an indicator for starting an air conditioning system by driving the starter motor 13 (START indicator), and the like. Information on an operation of the ignition switch 68 by the driver is output to the controller 6. The vehicle speed sensor 69 detects a vehicle speed of the vehicle. The detection result by the vehicle speed sensor 69 is output to the controller 6.

The advanced driver assistance system 70 is a system that performs autonomous brake control, autonomous cruise control, lane keep control, and the like to assist driver's driving. The processing results by the advanced driver assistance system 70 are output to the controller 6. The display device 71 displays a warning indicator to notify the driver that some abnormality has occurred in the autonomous driving mode and to urge the driver to perform a driving operation. The buzzer 72 outputs a warning sound to notify the driver that some abnormality has occurred in the autonomous driving mode and to urge the driver to perform a driving operation.

The controller 6 switches the main relay 4 and the additional relay 5 on and off depending on the state of the vehicle, the driving mode, or the circuit voltage of the second load circuit 2. For example, when the vehicle is in the parked state, the controller 6 maintains the on state of the main relay 4 and the off state of the additional relay 5. Then, when the vehicle changes from the parked state to the travel-ready state, the controller 6 switches the additional relay 5 from off to on while maintaining the on state of the main relay 4.

When the driving mode of the vehicle is the normal driving mode, and when the circuit voltage of the second load circuit 2 is within the predetermined voltage range, the controller 6 maintains the on state of the main relay 4 and the additional relay 5. On the other hand, when the circuit voltage of the second load circuit 2 is outside the predetermined voltage range, the controller 6 maintains the on state of the main relay 4 and turns off the additional relay 5.

Further, when the driving mode of the vehicle is the autonomous driving mode, and when the circuit voltage of the second load circuit 2 is within the predetermined voltage range, the controller 6 turns on the main relay 4 and the additional relay 5. On the other hand, when the driving mode of the vehicle is the autonomous driving mode, and when the circuit voltage of the second load circuit 2 is outside the predetermined voltage range, the controller 6 turns off the main relay 4 and turns on the additional relay 5.

Here, in the autonomous driving mode, there are concerns that the additional relay 5 may be suddenly turned off for some reason, causing the lithium ion battery 21, which is a backup power supply source, and each load included in the second load circuit 2 to be electrically disconnected from each other. However, in the autonomous driving mode, since the additional relay 5 maintains the on state, the lithium ion battery 21 and each load included in the second load circuit 2 can be prevented from being electrically disconnected from each other. In other words, according to the power supply system 100 and the method for controlling the power supply system 100 of the present embodiment, it is possible to prevent the remaining battery level of the lithium ion battery 21 from decreasing due to dark current discharge, and to ensure a backup operation of the lithium ion battery 21.

Figure 2:
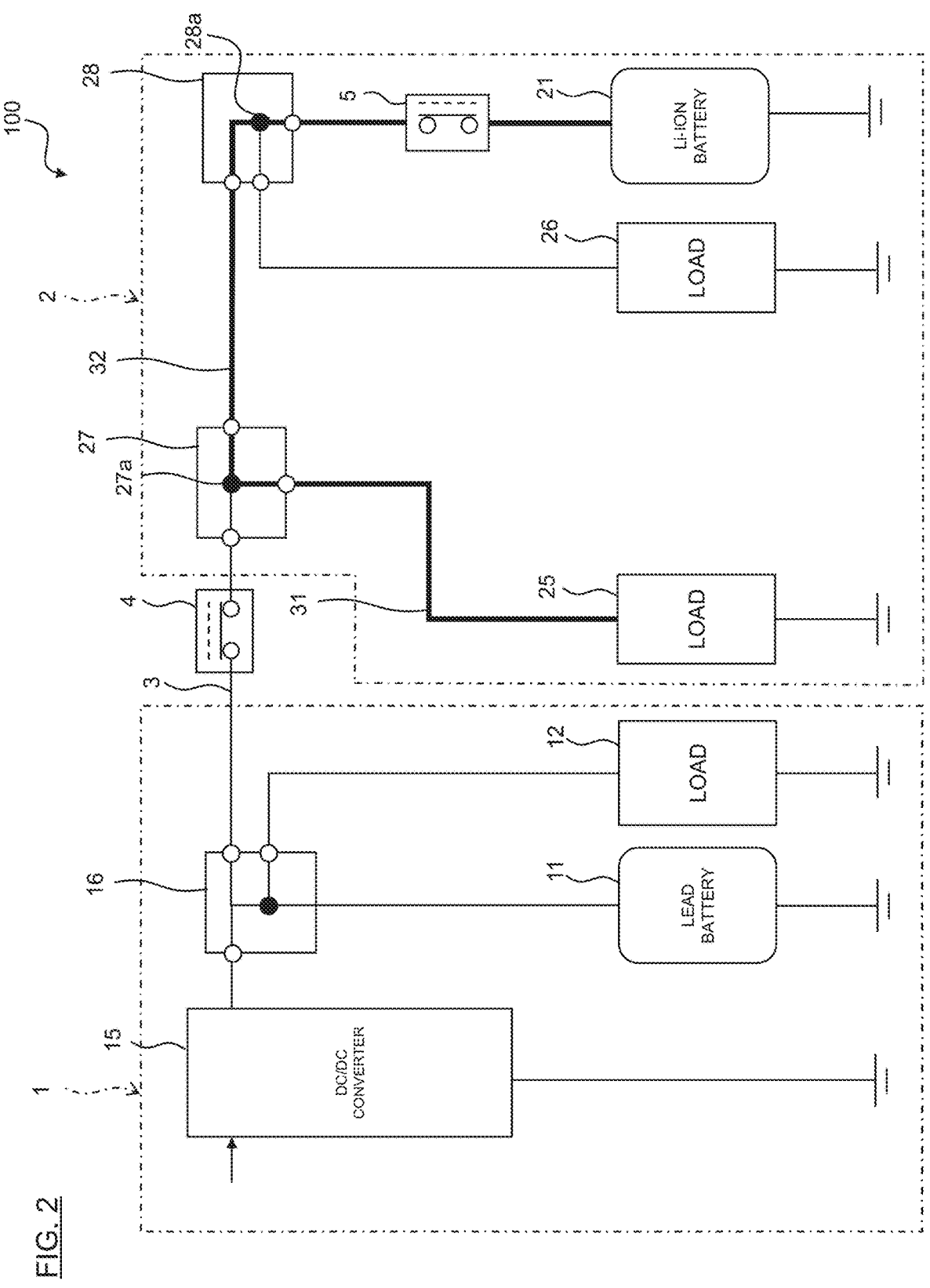
FIG. 2 is a conceptual diagram for describing a connection form of the power supply system illustrated in FIG. 1.
Figure 3:
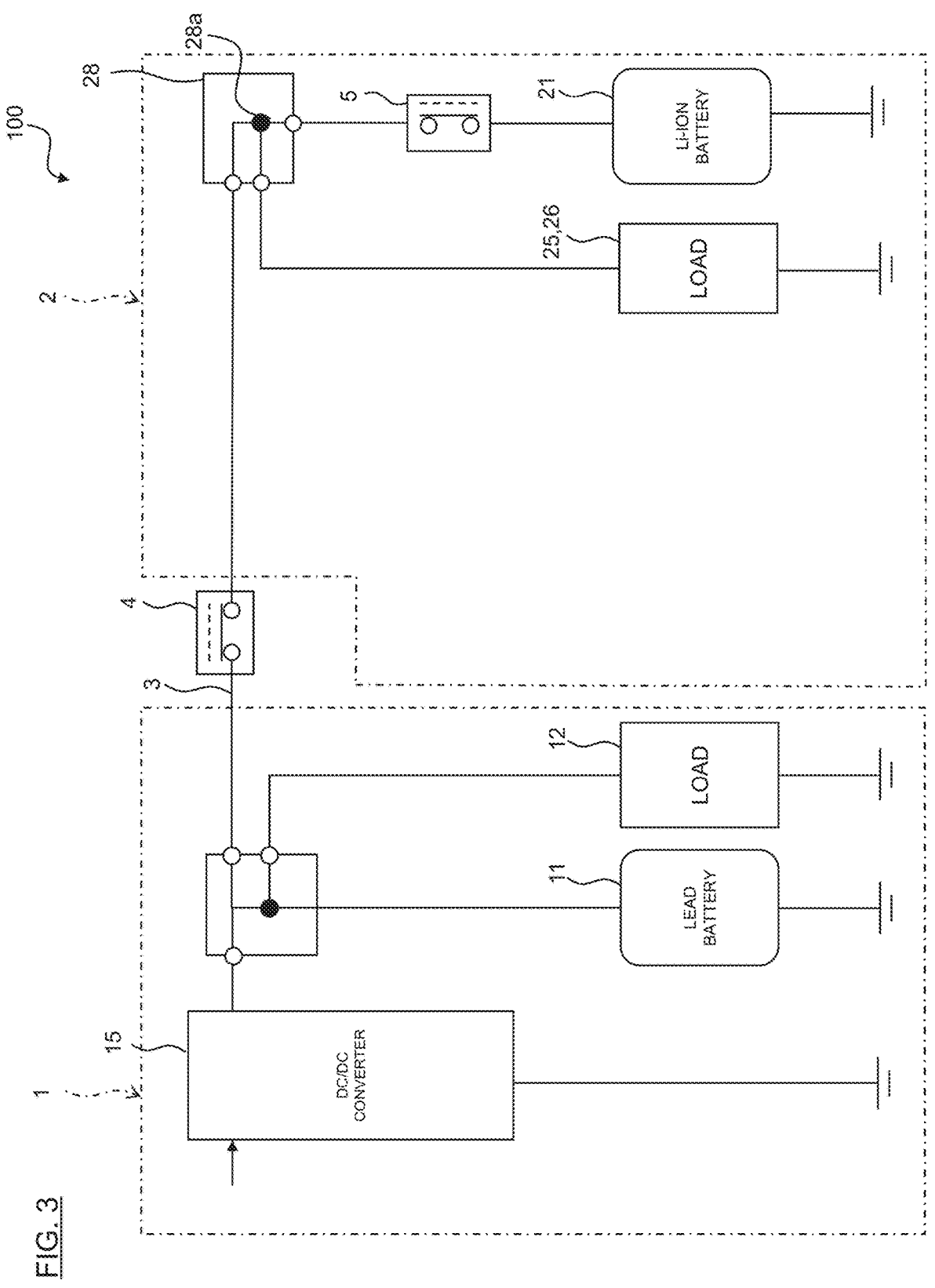
FIG. 3 is a conceptual diagram for describing a connection form of a power supply system as a comparative example.

Next, a connection form of the power supply system 100 will be described with reference to FIGS. 2 and 3. FIG. 2 is a conceptual diagram for describing the connection form of the power supply system 100 according to the present embodiment. FIG. 3 is a conceptual diagram for describing a connection form of a power supply system 100 according to a comparative example. Note that in FIG. 2, a part of the configuration of the power supply system 100 illustrated in FIG. 1 is not illustrated. The first load circuit 1 is connected on the upstream side of the main relay 4, and the second load circuit 2 is connected on the downstream side of the main relay 4.

The first load circuit 1 includes a DC/DC converter 15 and a wiring box 16 in addition to the lead battery 11, the load 12, and others. The DC/DC converter 15 boosts the voltage generated by electricity generation by the alternator 14, and outputs the resulting voltage to the lead battery 11 and the main relay 4. The wiring box 16 branches a wire on the output side of the DC/DC converter 15 into the lead battery 11, the load 12, and the main relay 4.

The second load circuit 2 includes wiring boxes 27 and 28 in addition to the lithium ion battery 21, the load 26, and others. The load 25 (second load) includes the EPS actuator 22, the ABS actuator 23, and the ADAS actuator 24, and is a load that is necessary for the vehicle to travel in the autonomous driving mode. The load 25 includes a steering wheel, a sensor for detecting a state around the vehicle, and the like in addition to the EPS actuator 22 and others. The wiring box 27 branches a current path on the downstream side of the main relay 4 into a path for passing a current to the load 25 and a path for passing a current to the lithium ion battery 21 via the additional relay 5. The wiring box 27 has a branch point 27a. The power supply line 3 has branch wires starting from the branch point 27a, and includes a wire 31 for connecting the branch point 27a and the load 25, and a wire 32 for connecting the branch point 27a and the lithium ion battery 21. The wiring box 27 is provided near the main relay 4. Specifically, the branch point 27a is located closer to the main relay 4 than to the lithium ion battery 21 on a wire for connecting the main relay 4 and the lithium ion battery 21.

The wiring box 28 is provided between the wiring box 27 and the lithium ion battery 21 and between the wiring box 27 and the load 26. The wiring box 28 is connected to the wire 32, has a branch point 28a, and branches the wire 32 into a path for passing a current from the branch point 28a to the load 26 and a path for passing a current from the branch point 28a to the lithium ion battery 21.

The first load circuit 1, the main relay 4, the load 25, and the wiring box 27 are provided at the front of the vehicle. On the other hand, the additional relay 5, the lithium ion battery 21, the load 26, and the wiring box 28a are provided at the rear of the vehicle. In particular, the lithium ion battery 21 is provided at the rear of the vehicle in order to reduce the risk of leakage from the lithium ion battery 21 when the vehicle receives an external impact. On the other hand, the alternator 14, which generates electric power for charging the lithium ion battery 21, the main relay 4, the load 25, and others are provided at the front of the vehicle. Therefore, in order to supply the electric power generated by the alternator 14 located at the front of the vehicle to the lithium ion battery 21 located at the rear of the vehicle, a long harness forming the wire 32 is used.

A relationship between the connection form of the power supply system 100 and the charging voltage of the lithium ion battery 21 will now be described. The lithium ion battery 21 can be charged at a higher voltage than the lead battery 11 in terms of the battery performance. Further, since the cost of the lithium ion battery 21 is higher than that of the lead battery 11, the lithium ion battery 21 is preferably charged at the highest possible voltage to increase the charging capacity of the lithium ion battery 21 and to minimize the number of cells mounted in the vehicle. For this reason, it is preferable to configure the connection form of the power supply system 100 so that the highest possible voltage is applied to the lithium ion battery 21 for charging. On the other hand, it is necessary to charge the lead battery so that the charging voltage of the lead battery 11 does not exceed the upper voltage limit of the lead battery.

As illustrated in FIG. 2, in the power supply system 100, the DC/DC converter 15, which increases the voltage generated by electricity generation by the alternator 14, and the lead battery 11 are located at the front of the vehicle and on the upstream side of the main relay 4. On the other hand, the lithium ion battery 21 is located at the rear of the vehicle and on the downstream side of the main relay 4. Therefore, in order to apply the highest possible voltage to the lithium ion battery 21 while keeping the charging voltage of the lead battery 11 equal to or lower than the upper voltage limit during charging of the battery, it is necessary to prevent a voltage drop in the wire between the main relay 4 and the lithium ion battery 21.

Further, the load 25 included in the second load circuit 2 is a load that is necessary for the vehicle to travel in autonomous driving, and consumes a large amount of current. For example, in order to operate the load 25 using electric power supplied from the first load circuit 1 to the second load circuit 2 via the main relay 4, there is also a connection form (connection form of the comparative example) in which the load 25 is connected to the branch point 28a of the wiring box 28 instead of the branch point 27a of the wiring box 27, as illustrated in FIG. 3. In other words, in the connection form of FIG. 3, the loads included in the second load circuit 2 are uniformly connected to the power supply line 3 regardless of the magnitude of current consumption.

In the connection form of the comparative example, since the load 25 operates using a large current, it is necessary to flow a large current through a wire from the downstream side of the relay 4 to the wiring box 28. Therefore, the voltage drop in the wire from the downstream side of the relay 4 to the wiring box 28 is large. Further, as described above, since a long harness is connected from the downstream side of the relay 4 to the wiring box 28, the voltage drop becomes even larger. As the voltage drop between the relay 4 and the lithium ion battery 21 is larger, the charging voltage of the lithium ion battery 21 is reduced, so that the lithium ion battery 21 cannot be charged to a sufficient amount.

On the other hand, in the present embodiment, the load 25 is connected to the branch point 27a located close to the main relay 4. The current flowing from the first load circuit 1 to the main relay 4 branches at the branch point 27a, a large current flows through the load 25, which consumes a large current, and a small current flows through the lithium ion battery 21. Specifically, the current value that is allowed for conduction through a current path of the wire 31 is higher than the current value that is allowed for conduction through a current path of the wire 32. In other words, the current path on the downstream side of the main relay 4 is configured such that the current flowing from the branch point 27a to the load 25 is higher than the current flowing from the branch point 27a to the lithium ion battery 21. This makes it possible to reduce the voltage drop in a wire from the branch point 27a to the lithium ion battery 21. As a result, it is possible to prevent a drop in the charging voltage of the lithium ion battery 21 while keeping the charging voltage of the lead battery 11 equal to or lower than the upper voltage limit.

As described above, in the present embodiment, provided are: a first load circuit 1 connected to a load 12 that operates using electric power from a lead battery 11; a second load circuit 2 connected to a load 25 that operates using electric power from the lead battery 11 or a lithium ion battery 21 and that is necessary to continue an autonomous driving mode; and a main relay 4 provided on a power supply line 3 to electrically connect or disconnect the first load circuit 1 to or from the second load circuit 2, wherein a current path on a downstream side of the main replay 4 includes a path (corresponding to a "first path" of the present invention) for allowing a current flowing from the first load circuit 1 to the main relay 4 to flow from a branch point 27a located on the downstream side of the main relay 4 to the load 25, and a path (corresponding to a "second path" of the present invention) for allowing the current to flow from the branch point 27a to the lithium ion battery 21, and a current value allowed for conduction through the path from the branch point 27a to the load 25 is higher than a current value allowed for conduction through the path from the branch point 27a to the lithium ion battery 21. This makes it possible to prevent a drop in the charging voltage of the lithium ion battery 21. As a result, the charging capacity of the lithium ion battery 21 can be increased.

Further, in the present embodiment, the branch point 27a is located closer to the main relay 4 than to the lithium ion battery 21 on the wire for connecting the main relay 4 and the lithium ion battery 21. This makes it possible to make the path through which a large current flows between the main relay 4 and the lithium ion battery 21 as short as possible, so that a voltage drop between the branch point 27a and the lithium ion battery 21 can be prevented.

Further, in the present embodiment, the load 25 connected to the branch point 27a is a load necessary for traveling in the autonomous driving mode. By connecting the load 25 that consumes a large current to the branch point 27a, the current flowing through the wire from the branch point 27a to the lithium ion battery 21 can be reduced, so that a voltage drop between the branch point 27a and the lithium ion battery 21 can be prevented.

Further, in the present embodiment, the second load circuit 2 includes the load 25 that consumes a large current, and the load 26 that consumes a small current (corresponding to a "small-current consuming load" of the present invention), and the load 26 is connected to the path from the branch point 27a to the lithium ion battery 21. As a result, the connection destination of the load 25 that consumes a large current and the connection destination of the load 26 that consumes a small current are separated, so that the voltage necessary for the loads 25 and 26 to operate can be secured, and a drop in the charging voltage of the lithium ion battery 21 can be prevented.

Figure 4:
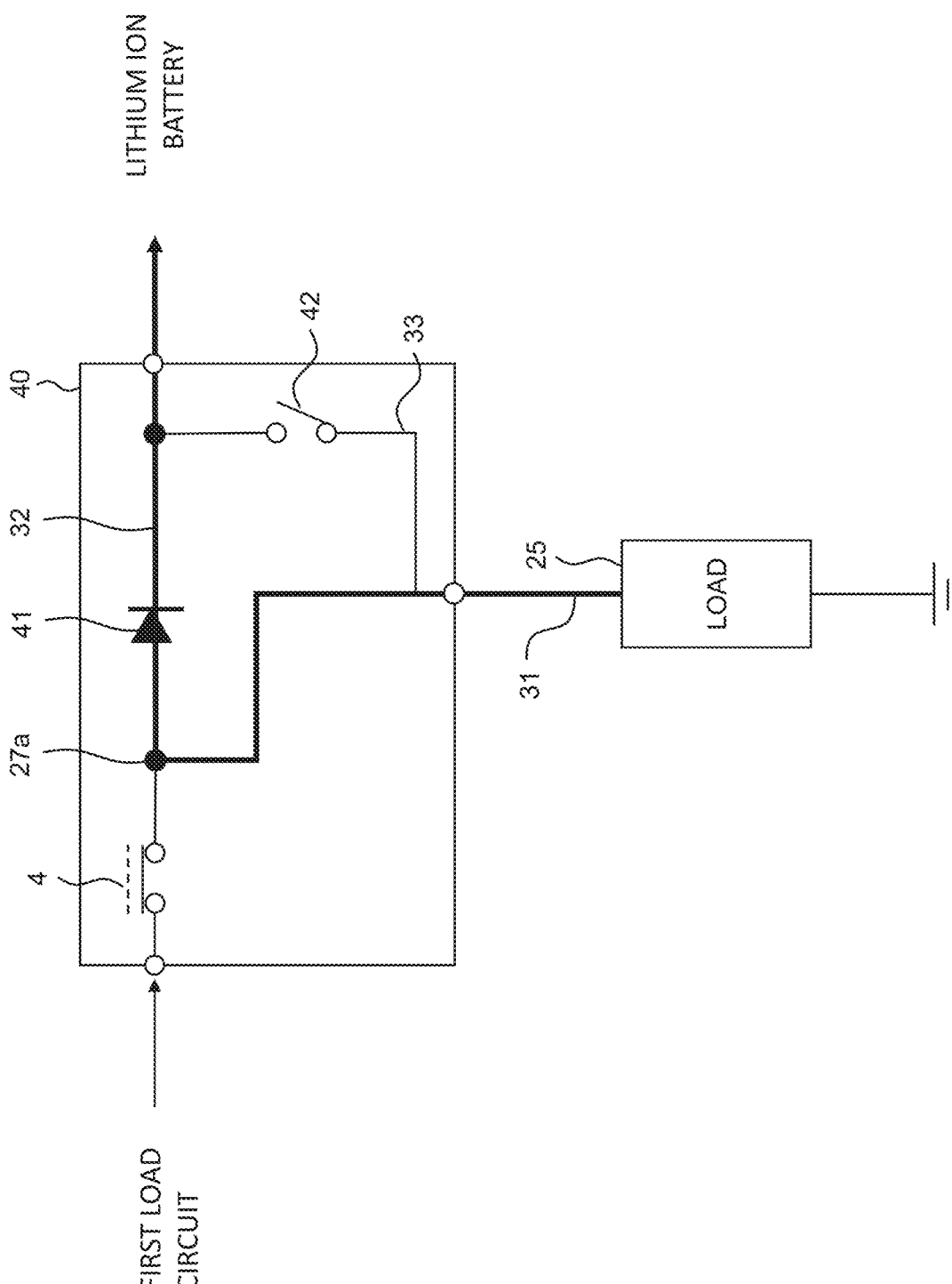
FIG. 4 is a schematic diagram of a configuration of a relay module provided in a power supply system according to a modification of the present embodiment.

Note that as a modification of the present embodiment, the branch wires of the wiring box 27 and the circuit connection/disconnection mechanism of the main relay 4 may be modularized. FIG. 4 is a schematic diagram of a configuration of a relay module 40. As illustrated in FIG. 4, the relay module 40 is a device in which the branch wires of the wiring box 27 and the circuit connection/disconnection mechanism of the main relay 4 are modularized, and includes a relay 4, a branch point 27a, a diode 41, and a switch 42. The relay module 40 is connected between the first load circuit 1 and the lithium ion battery 21.

The relay 4 is connected on the upstream side within the relay module 40. The branch point 27a is provided on the downstream side of the relay 4 within the relay module 40. Among the branch wires from the branch point 27a, one wire 31 is connected to the load 25, and the other wire 32 is connected to the lithium ion battery 21. The diode 41 is connected to the wire 32 with the direction in which a current flows from the branch point 27a to the lithium ion battery 21 as the forward direction. Further, the relay module 40 includes a bypass wire 33 that bypasses the wire 31 and the wire 32, and the switch 42 is connected to the bypass wire 33. The switch 42 operates in cooperation with the on/off state of the relay 4; when the relay 4 is on, the switch 42 is turned off, and when the relay 4 is off, the switch 42 is turned on. To supply electric power from the first load circuit 1 to the second load circuit 2 via the relay 4, the relay 4 is turned on, and the switch 42 is turned off. Further, for example, when an abnormality occurs in the first load circuit 1 with the driving mode being the autonomous driving mode, the relay 4 is turned off and the switch 42 is turned on to supply the electric power of the lithium ion battery 21 to the load 25. Thus, the lithium ion battery 21 functions as a backup power source.

A connection form (Reference Example 1) will now be described in which the relay module 40 does not include the bypass wire 33, the diode 41, or the switch 42. In the connection form of Reference Example 1, when the relay 4 is turned off to cause the lithium ion battery 21 to function as a backup power source, the current of the lithium ion battery 21 flows into the load 25 through the wire 32, the branch point 27a, and the wire 31 in this order. In such a connection form, since the current of the lithium ion battery 21 flows via the branch point 27a, the voltage drop is larger than in the modification.

Further, a connection form (Reference Example 2) will be described in which the relay module 40 does not include the diode 41 or the switch 42. In the connection form of Reference Example 2, when the relay 4 is turned on to supply electric power from the first load circuit 1 to the second load circuit 2, a path through which a current flows by bypassing the bypass wire 33 is made between the relay 4 and the load 25 in addition to the path of the wire 31, which is the original path. Therefore, the current flowing from the relay 4 to the lithium ion battery 21 becomes small.

In the connection form of the modification, when the lithium ion battery 21 functions as a backup power source, the switch 42 is turned on, so that the current from the lithium ion battery 21 flows through the bypass wire 33 and does not flow through the branch point 27a. This makes it possible to prevent a drop in the voltage applied to the load 25 when the lithium ion battery 21 functions as a backup power source. In addition, in the connection form of the modification, when electric power is supplied from the first load circuit 1 to the second load circuit 2, the switch 42 is turned off, so that the current from the relay 4 flows through the wires 31 and 32 and does not flow through the bypass wire 33. This makes it possible to prevent the current flowing from the relay 4 to the lithium ion battery 21 from becoming small.

As described above, the power supply system 100 according to the modification includes a relay module in which the branch wires including the branch point 27a and the main relay 4 are modularized. This makes it possible to modularize the branch wires and the circuit connection/disconnection mechanism of the main relay 4, thereby increasing the versatility of a product.

Further, the power supply system 100 according to the modification includes the switch 42 connected between the wire 31 and the wire 32. This makes it possible to switch a current path between when electric power is supplied from the first load circuit 1 to the second load circuit 2 and when the lithium ion battery 21 functions as a backup power source.

Further, as a modification of the present embodiment, a DC/DC converter may be used instead of the additional relay 5 as a circuit connection/disconnection mechanism (corresponding to a "second circuit connection/disconnection mechanism" of the present invention). This makes it possible to achieve both a battery connection/disconnection mechanism and voltage boosting for charging of the lithium ion battery 21.

Second Embodiment

Figure 5:
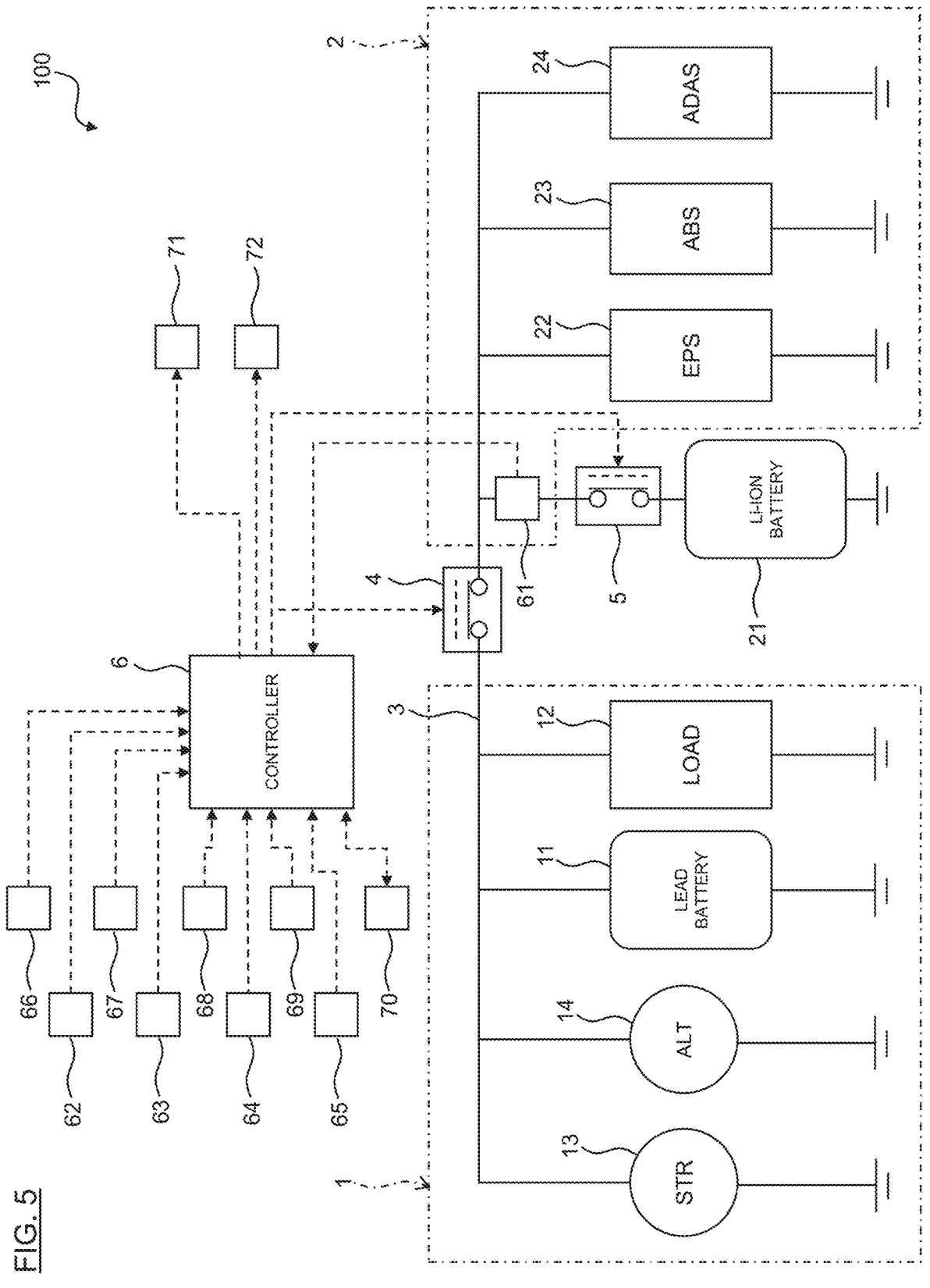
FIG. 5 is a schematic diagram of a configuration of a power supply system according to a second embodiment.

Next, a second embodiment will be described with reference to the drawings. FIG. 5 is a schematic diagram of a configuration of a power supply system 100 according to the second embodiment. In the present embodiment, the method for controlling the main relay 4 and the additional relay 5 by the controller is different from the first embodiment, but the other configurations are the same as the first embodiment. Below, parts that are different from the first embodiment will be described, parts having the same configuration as the first embodiment will be given the same reference numerals, and thus, the description thereof will be omitted while the description of the first embodiment will be used as appropriate.

As illustrated in FIG. 5, in the power supply system 100 according to the second embodiment, the load 26 is omitted from the power supply system 100 according to the first embodiment.

Figure 6A:
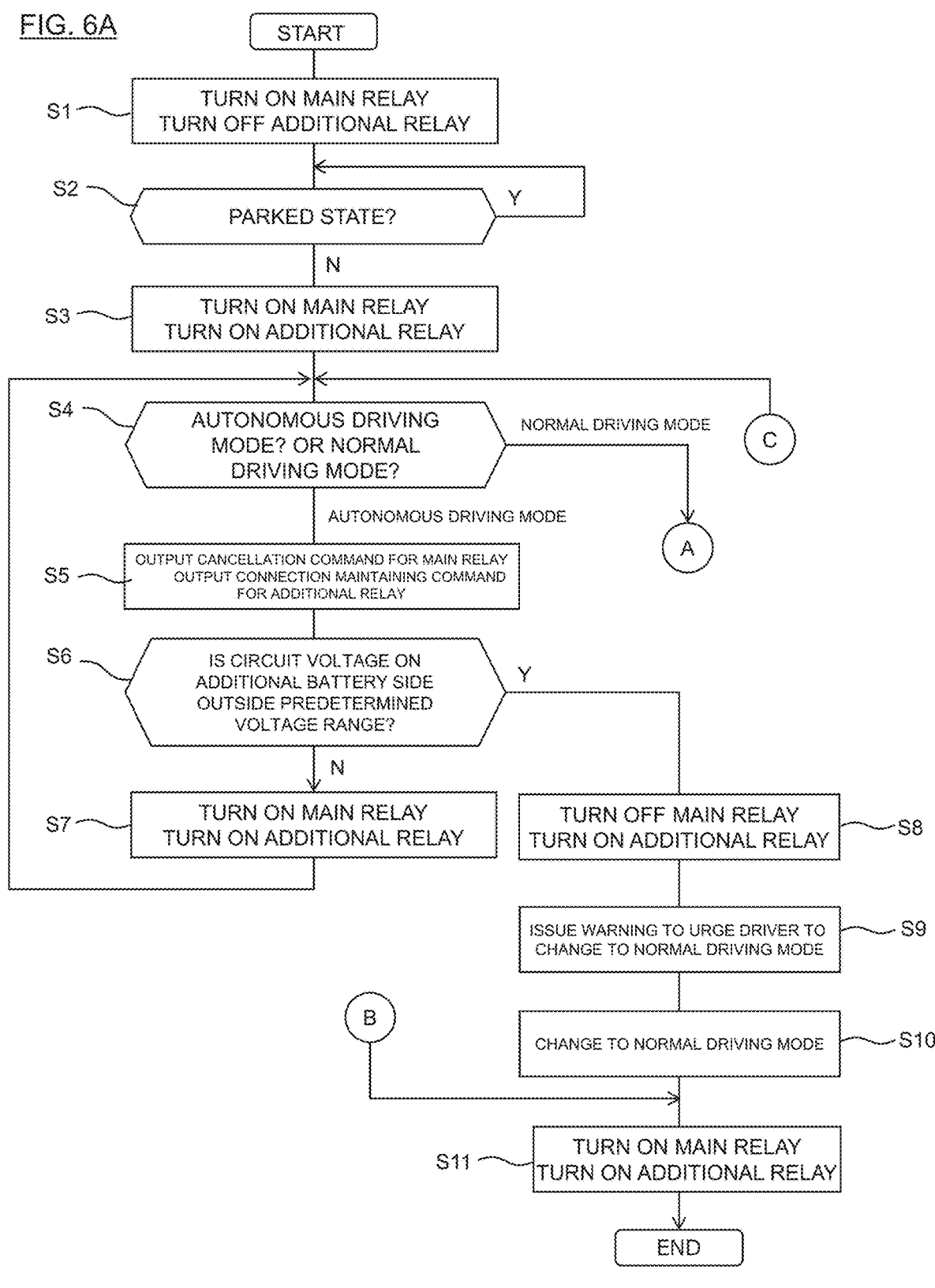
FIG. 6A is a flowchart illustrating an example of a procedure of a method for controlling a power supply system executed by a controller illustrated in FIG. 5.
Figure 6B:
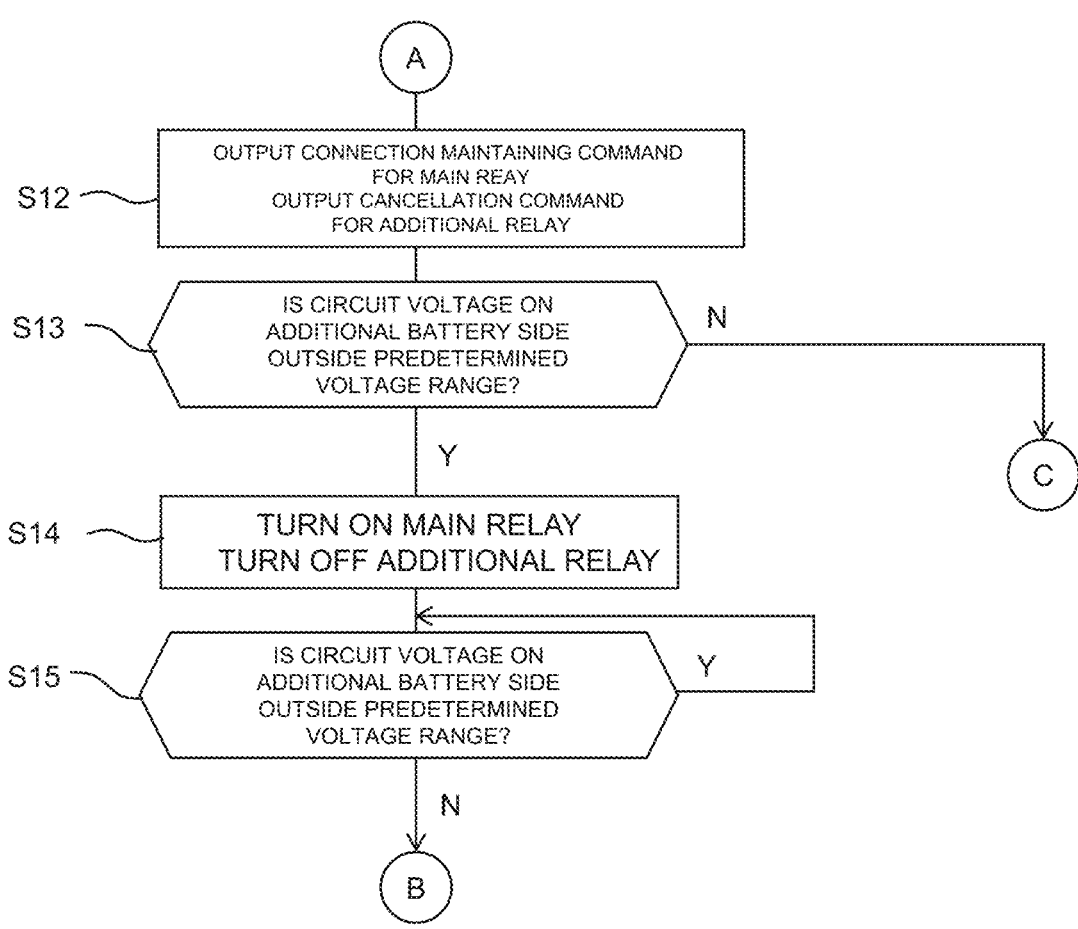
FIG. 6B is a flowchart illustrating an example of the procedure of the method for controlling the power supply system executed by the controller illustrated in FIG. 5.

Next, the functions implemented by the controller 6 will be described with reference to FIGS. 6A and 6B. FIGS. 6A and 6B are flowcharts illustrating an example of a procedure of the method for controlling the power supply system 100 executed by the controller 6 illustrated in FIG. 5. Note that this procedure of the controlling method is started from a state where the ignition switch 68 is turned off (parked state of the vehicle).

In step S1, the controller 6 outputs a closing control signal to turn on a relay (hereinafter simply referred to as a closing control signal) to the main relay 4, and outputs an opening control signal to turn off a relay (hereinafter simply referred to as an opening control signal) to the additional relay 5. When the additional relay 5 is electrically connected to each load included in the second load circuit 2 in the parked state of the vehicle, the lithium ion battery 21 is discharged by the dark current of the load. By the process of this step, the additional relay 5 is electrically disconnected from each load included in the second load circuit 2, so that it is possible to prevent the lithium ion battery 21 from being discharged by the dark current of the load.

The processing to be performed by the controller 6 before the opening control signal is output to the main relay 4 or the additional relay 5 in the flowcharts illustrated in FIGS. 6A and 6B will now be described. In the present embodiment, the controller 6 performs opening/closing control of the main relay 4 and the additional relay 5 to turn on at least one of the main relay 4 and the additional relay 5. Specifically, the controller 6 acquires information on the state of the main relay 4 and the state of the additional relay 5, does not output the opening control signal to the main relay 4 when the additional relay 5 is in the off state, and does not output the opening control signal to the additional relay 5 when the main relay 4 is in the off state. This processing is to prevent both the main relay 4 and the additional relay 5 from being turned off and prevent the power supply to each load included in the second load circuit from being interrupted.

Examples of the information on the states of the main relay 4 and the additional relay 5 include a detection result of the current sensor 61, and the controller 6 determines the states of the main relay 4 and the additional relay 5 from the detection result of the current sensor 61.

For example, when a current direction detected by the current sensor 61 (hereinafter referred to as a detected current direction) is a direction to the lithium ion battery 21, the controller 6 determines that both the main relay 4 and the additional relay 5 are in the on state. Further, when the detected current direction is a direction from the lithium ion battery 21 to the first load circuit 1, the controller 6 may determine that both the main relay 4 and the additional relay 5 are in the on state. Further, when the detected current direction is a direction from the lithium ion battery 21 to each load included in the second load circuit 2, the controller 6 determines that the main relay 4 is in the off state and the additional relay 5 is in the on state. Further, when the detected current direction is not either direction, the controller 6 determines that at least the additional relay 5 is in the off state. Note that the determination method using the detection result of the current sensor 61 is only an example. For example, when a signal indicating the on state or the off state can be acquired from each of the main relay 4 and the additional relay 5, the controller 6 may determine the states of the main relay 4 and the additional relay 5 based on the signals acquired from the main relay 4 and the additional relay 5. In the description of the following steps, it is assumed that when the controller 6 outputs the opening control signal to the main relay 4 or the additional relay 5, the controller 6 executes the above-described processing before outputting the opening control signal.

Returning to FIG. 6A, in step S2, the controller 6 determines whether or not the vehicle is in the parked state based on operation information from the ignition switch 68. When the controller 6 acquires an on signal indicating that the drive source of the vehicle has been started from the ignition switch 68, the controller 6 determines that the vehicle has changed from the parked state to the travel-ready state and that the vehicle is not in the parked state accordingly. On the other hand, when the controller 6 acquires an off signal indicating that the drive source of the vehicle is stopped from the ignition switch 68, the controller 6 determines that the vehicle is in the parked state. When the controller 6 makes a negative determination, the processing proceeds to step S3. When the controller 6 makes an affirmative determination, the controller 6 waits in step S2 for a negative determination, that is, for the ignition switch 68 being turned on and the vehicle being ready to travel accordingly. While the processing of the controller 6 waits in step S2, the additional relay 5 is turned off by the process of step S1, so that it is possible to prevent the lithium ion battery 21 from being discharged by the dark current of the load. Note that the method for determining whether or not the vehicle is in the parked state is not limited to the determination method based on operation information from the ignition switch 68, and may be any other determination method known at the time of filing of this application.

In step S3, the controller 6 outputs a closing control signal to the main relay 4 and an opening control signal to the additional relay 5. Note that since the processing for the main relay 4 is similar to step S1, the controller 6 may not output the closing control signal to the main relay 4.

Further, in step S3, when the additional relay 5 is in the off state, the controller 6 may switch the additional relay 5 from off to on at the timing when it is detected that the vehicle speed is equal to or higher than a predetermined speed. For example, when the controller 6 detects that the vehicle speed is equal to or higher than several km/h based on the detection result from the vehicle speed sensor 69, the controller 6 may output the opening control signal to the additional relay 5 at the timing of the detection. The predetermined speed is a preset speed.

In step S4, the controller 6 determines whether the driving mode of the vehicle is the autonomous driving mode or the normal driving mode. For example, when the controller 6 acquires an on signal from the autonomous driving mode switch 62, the controller 6 may determine that the driving mode of the vehicle is the autonomous driving mode. Further, when the controller 6 detects the output of a control signal for operating each load included in the second load circuit 2, the controller 6 may determine that the driving mode of the vehicle is the autonomous driving mode. Further, when the controller 6 acquires a signal indicating that each load included in the second load circuit 2 is in operation, the controller 6 may determine that the driving mode of the vehicle is the autonomous driving mode. When any one of the above-described examples applies, the controller 6 determines that the driving mode of the vehicle is the autonomous driving mode. On the other hand, when none of the above-described examples applies, the controller 6 determines that the driving mode of the vehicle is the normal driving mode. When it is determined that the driving mode of the vehicle is the autonomous driving mode, the processing proceeds to step S5, and when it is determined that the driving mode of the vehicle is the normal driving mode, the processing proceeds to step S12 illustrated in FIG. 6B.

Note that a method for determining that the driving mode of the vehicle is the normal driving mode has been described using as an example a method for determining that the driving mode of the vehicle is not the autonomous driving mode. However, it may be determined that the driving mode of the vehicle is the normal driving mode in any other way. For example, when the controller 6 acquires an off signal from the autonomous driving mode switch 62, the controller 6 may determine that the driving mode of the vehicle is the normal driving mode. Further, when the controller 6 acquires a signal of a brake operation by the driver from the brake switch 66, the controller 6 may determine that the driving mode of the vehicle is the normal driving mode. Further, when the controller 6 acquires a signal of a steering operation by the driver from the torque sensor 67, the controller 6 may determine that the driving mode of the vehicle is the normal driving mode. When any one of the above-described examples applies, the controller 6 may determine that the driving mode of the vehicle is the normal driving mode. Further, the controller 6 may acquire a driving mode signal indicating the driving mode of the vehicle from the advanced driver assistance system 70, and determine, based on the driving mode signal, whether the driving mode of the vehicle is the autonomous driving mode or the normal driving mode. For example, when the advanced driver assistance system 70 acquires an on signal from the autonomous driving mode switch 62, the advanced driver assistance system 70 determines that the driving mode of the vehicle is the autonomous driving mode. Further, when the advanced driver assistance system 70 acquires an off signal from the autonomous driving mode switch 62, the advanced driver assistance system 70 determines that the driving mode of the vehicle is the normal driving mode. The controller 6 may determine whether the driving mode of the vehicle is the autonomous driving mode or the normal driving mode according to the driving mode signal acquired from the advanced driver assistance system 70.

In step S5, the controller 6 outputs a cancellation command to the main relay 4, and outputs a connection maintaining command to the additional relay 5. As described in connection with the additional relay 5, the connection maintaining command is a command that has a compulsory force to maintain the on state. Therefore, for example, even when an opening/closing control signal is input to the additional relay 5 for some reason, in a case where the connection maintaining command has been input to the additional relay 5 before that, the additional relay 5 ignores the input opening/closing control signal and forcibly maintains the on state according to the connection maintaining command. When it is determined that the driving mode of the vehicle is the autonomous driving mode, in this step, the controller 6 maintains the on state of the additional relay 5. Further, until the controller 6 outputs a cancellation command to the additional relay 5, the controller 6 outputs the connection maintaining command to the additional relay 5 at predetermined intervals (e.g., every 100 ms). This makes it possible to further reduce the possibility that the additional relay 5 is turned off in the autonomous driving mode. On the other hand, the controller 6 outputs the cancellation command to the main relay 4 so that the main relay 4 can be controlled by an opening/closing control signal. In a case where the main relay 4 is a semiconductor relay having the self-disconnection/connection function as in the present embodiment, the self-disconnection/connection function of the main relay 4 is enabled by the cancellation command.

In step S6, the controller 6 determines whether or not a voltage abnormality has occurred in the power supply system 100 based on the circuit voltage of the second load circuit 2. The controller 6 determines, based on the detection result of the second voltage sensor 64, whether or not the circuit voltage on the additional battery side (circuit voltage of the second load circuit 2) is outside a predetermined voltage range. The predetermined voltage range is a range using a unit of voltage and is also a predetermined range. The upper limit value of the predetermined voltage range is a voltage value defined to prevent overvoltage from being applied to each load included in the second load circuit 2, and the lower limit value of the predetermined range is a voltage value defined to operate each load included in the second load circuit 2 according to the specifications. When the controller 6 makes a negative determination, that is, when it is determined that a voltage abnormality has not occurred in the power supply system 100, the processing proceeds to step S7. On the other hand, when the controller 6 makes an affirmative determination, that is, when it is determined that a voltage abnormality has occurred in the power supply system 100, the processing proceeds to step S8.

In step S7, the controller 6 outputs a closing control signal to the main relay 4 and the additional relay 5. Note that in the example of FIG. 6A, step S7 is illustrated for comparison with step S8. However, since the main relay 4 is turned on by the process of step S1 or step S3, and the additional relay 5 is turned on by the process of step S5, the controller 6 may skip the process of step S7. When the process of step S7 is completed, the processing returns to step S4 to determine the driving mode of the vehicle again. When a voltage abnormality does not occur in the power supply system 100 in a state where the vehicle can travel in the autonomous driving mode, the processes of steps S4 to S7 are repeatedly executed, so that both the main relay 4 and the additional relay 5 maintain the on state.

When an affirmative determination is made in step S6, the processing proceeds to step S8. In step S8, the controller 6 outputs an opening control signal to the main relay 4, and outputs a closing control signal to the additional relay 5. When the circuit voltage of the second load circuit 2 falls outside the predetermined voltage range in the autonomous driving mode, the main relay 4 is switched from on to off. On the other hand, even when the circuit voltage of the second load circuit 2 is outside the predetermined voltage range in the autonomous driving mode, the additional relay 5 maintains the on state through the process of step S5, regardless of the circuit voltage of the second load circuit 2. By switching the main relay 4, the power supply from the first load circuit 1 side to each load included in the second load circuit 2 is cut off. However, since the additional relay 5 maintains the on state, each load included in the second load circuit 2 is supplied with electric power from the lithium ion battery 21. In other words, in the autonomous driving mode, each load included in the second load circuit 2 can continue to operate with the electric power from the lithium ion battery 21 even when the power supply from the first load circuit 1 side is cut off. Note that, since the connection maintaining command has been input to the additional relay 5 through the process of step S5, the controller 6 may not output the closing control signal to the additional relay 5.

Further, in the case where the main relay 4 is a semiconductor relay having the self-disconnection/connection function as in the present embodiment, the switching from on to off of the main relay 4 may be performed by the self-disconnection/connection function of the main relay 4. For example, when the main relay 4 detects that the circuit voltage of the second load circuit 2 (the terminal voltage of the main relay 4 connected to the second load circuit 2) is outside the predetermined voltage range based on the detection result from the second voltage sensor 64, the main relay 4 may be switched from on to off using the self-disconnection/connection function. It is faster for the main relay 4 to be switched from on to off using the self-disconnection/connection function than for the opening control signal to be transmitted from the controller 6 to the main relay 4. Therefore, it is possible to further shorten the time during which the circuit voltage of the second load circuit 2 is outside the predetermined voltage range, and thus to further protect each load included in the second load circuit 2.

In step S9, the controller 6 outputs a warning indicator signal to the display device 71 to notify the driver that an abnormality has occurred in the autonomous driving mode. Further, the controller 6 may output a warning sound signal to the buzzer 72. Further, the controller 6 may output a warning indicator signal to the display device 71, and also output a warning sound signal to the buzzer 72. The process of this step urges the driver to change the driving mode from the autonomous driving mode to the normal driving mode. In other words, this step is a step for requesting the driver to take back the driving control that is being performed by the driver assistance device. Since the additional relay 5 maintains the on state by the process of step S5, each load included in the second load circuit 2 operates with the electric power from the lithium ion battery 21, and the autonomous travel of the vehicle in the autonomous driving mode continues.

Since the condition for canceling the autonomous driving mode is operational intervention by the driver, when the driver performs driving operations, such as a brake operation, an accelerator operation, and a steering operation, the controller 6 determines in step S10 that the driving mode of the vehicle has changed from the autonomous driving mode to the normal driving mode. For example, when the controller 6 acquires a signal of a brake operation by the driver from the brake switch 66 or acquires a signal of a steering operation by the driver from the torque sensor 67, the controller 6 determines that the autonomous driving mode has been canceled and the driving mode of the vehicle has changed to the normal driving mode.

In step S11, the controller 6 outputs a closing control signal to the main relay 4 and the additional relay 5. Since the connection maintaining command has been input to the additional relay 5 through the process of step S5, the controller 6 may not output the closing control signal to the additional relay 5. Further, the controller 6 may output a cancellation command to the additional relay 5 with respect to the connection maintaining command output in step S5. When the process of step S11 is completed, the controller 6 ends the processing illustrated in FIGS. 6A and 6B.

When it is determined in step S4 that the driving mode of the vehicle is the normal driving mode, the processing proceeds to step S12 illustrated in FIG. 6B. In step S12, the controller 6 outputs a connection maintaining command to the main relay 4, and outputs a cancellation command to the additional relay 5. As described in connection with the main relay 4, the connection maintaining command is a command that has a compulsory force to maintain the on state. Therefore, for example, even when an opening/closing control signal is input to the main relay 4 for some reason, in a case where the connection maintaining command has been input to the main relay 4 before that, the main relay 4 ignores the input opening/closing control signal and forcibly maintains the on state according to the connection maintaining command. When it is determined that the driving mode of the vehicle is the normal driving mode, in this step, the controller 6 maintains the on state of the main relay 4. Further, until the controller 6 outputs a cancellation command to the main relay 4, the controller 6 outputs the connection maintaining command to the main relay 4 at predetermined intervals (e.g., every 100 ms). This makes it possible to further reduce the possibility that the main relay 4 is turned off in the normal driving mode. In the case where the main relay 4 is a semiconductor relay having the self-disconnection/connection function as in the present embodiment, the self-disconnection/connection function of the main relay 4 is disabled in this step, so that the main relay 4 can be prevented from being switched from on to off by the self-disconnection/connection function. On the other hand, the controller 6 outputs the cancellation command to the additional relay 5 so that the additional relay 5 can be controlled by an opening/closing control signal.

In step S13, the controller 6 determines whether or not a voltage abnormality has occurred in the power supply system 100 based on the circuit voltage of the second load circuit 2. Step S13 corresponds to step S6, and thus, the description of step S6 will be referred to for the description of step S13. When the controller 6 makes a negative determination, that is, when it is determined that a voltage abnormality has not occurred in the power supply system 100, the processing returns to step S4 illustrated in FIG. 6A. On the other hand, when the controller 6 makes an affirmative determination, that is, when it is determined that a voltage abnormality has occurred in the power supply system 100, the processing proceeds to step S14.

When a negative determination is made in step S13, the processing returns to step S4 to determine the driving mode of the vehicle again. When a voltage abnormality does not occur in the power supply system 100 in a state where the vehicle can travel in the normal driving mode, the processes of step S4, step S12, and step S13 are repeatedly executed, so that both the main relay 4 and the additional relay 5 maintain the on state. Note that when the ignition switch 68 is turned off while the processes of step S4, step S12, and step S13 are being repeatedly executed, the controller 6 determines that the vehicle has changed from the travel-ready state to the parked state, outputs a closing control signal to the main relay 4, and outputs an opening control signal to the additional relay 5, as with the process of step S1. The additional relay 5 is switched from on to off while the main relay 4 maintains the on state.

A possible state of the power supply system 100 brought about in a case where the additional relay 5 is switched from on to off from a state where the first load circuit 1 and the second load circuit 2 are electrically connected to each other and a current is flowing from the first load circuit 1 side to the second load circuit 2 side accordingly will now be described. For example, while the processes of step S4, step S12, and step S13 are repeatedly executed, the main relay 4 and the additional relay 5 both maintain the on state, and thus, a current from the first load circuit 1 side is input to the lithium ion battery 21 via the additional relay 5. In the case where the additional relay 5 is a mechanical relay as in the present embodiment, when the additional relay 5 is switched from on to off, a back electromotive force is generated in the additional relay 5 in order to maintain the current flowing through a coil of the mechanical relay. The back electromotive force turns to a surge voltage that occurs instantaneously, and is input to the main relay 4 via the power supply line 3. In the case where the main relay 4 is a semiconductor relay having the self-disconnection/connection function as in the present embodiment, the main relay 4 may be switched from on to off by the self-disconnection/connection function in response to detecting the surge voltage. However, the main relay 4 maintains the on state because the self-disconnection/connection function is disabled through the process of step S12. Therefore, even when the surge voltage is input to the main relay 4 due to the switching of the additional relay 5 from on to off, the main relay 4 can be prevented from being switched from on to off. This makes it possible for each load included in the second load circuit 2 to continue to be supplied with electric power from the first load circuit 1 side, maintaining the circuit voltage of the second load circuit 2.

Returning to FIG. 6B, when an affirmative determination is made in step S13, the processing proceeds to step S14. In step S14, the controller 6 outputs a closing control signal to the main relay 4, and outputs an opening control signal to the additional relay 5. When the circuit voltage of the second load circuit 2 falls outside the predetermined voltage range in the normal driving mode, the additional relay 5 is switched from on to off. On the other hand, even when the circuit voltage of the second load circuit 2 is outside the predetermined voltage range in the normal driving mode, the main relay 4 maintains the on state through the process of step S12, regardless of the circuit voltage of the second load circuit 2. As described above, since the additional relay 5 is switched from on to off with the main relay 4 being in the on state, a surge voltage may occur due to the switching of the additional relay 5 in this step as well. However, the main relay 4 maintains the on state through the process of step S12. Note that, since the connection maintaining command has been input to the main relay 4 through the process of step S12, the controller 6 may not output the closing control signal to the main relay 4.

In step S15, the controller 6 determines, based on the circuit voltage of the second load circuit 2, whether or not the voltage abnormality that occurred in step S13 continues. Step S15 corresponds to step S6 and step 13, and thus, the description of step S6 and step 13 will be referred to for the description of step S15. When the controller 6 makes a negative determination, that is, when it is determined that a voltage abnormality has not occurred in the power supply system 100, the processing proceeds to step S11 illustrated in FIG. 6A. On the other hand, when the controller 6 makes an affirmative determination, that is, when it is determined that the voltage abnormality continues to occur in the power supply system 100, the controller 6 waits in step S15 for an affirmative determination.

When the ignition switch 68 is turned off while the controller 6 waits in step S15, the controller 6 determines that the vehicle has changed from the travel-ready state to the parked state, outputs a closing control signal to the main relay 4, and outputs an opening control signal to the additional relay 5, as with the process of step S1. Further, the controller 6 may output a cancellation command to the main relay 4 with respect to the connection maintaining command output in step S12.

When a negative determination is made in step S15, the processing proceeds to step S11 illustrated in FIG. 6A, and in step S11, the controller 6 outputs a closing control signal to the main relay 4 and the additional relay 5. Since the connection maintaining command has been input to the main relay 4 through the process of step S12, the controller 6 may not output the closing control signal to the main relay 4. Further, the controller 6 may output a cancellation command to the main relay 4 with respect to the connection maintaining command output in step S12. When the process of step S11 is completed, the controller 6 ends the processing illustrated in FIGS. 6A and 6B.

Note that when the processing proceeds from step S15 to step S11 and the ignition switch 68 is then turned off, the controller 6 determines that the vehicle has changed from the travel-ready state to the parked state, outputs a closing control signal to the main relay 4, and outputs an opening control signal to the additional relay 5, as with the process of step S1. Further, the controller 6 may output a cancellation command to the main relay 4 with respect to the connection maintaining command output in step S12.

As described above, the power supply system 100 according to the present embodiment is a power supply system installed in a vehicle that has a normal driving mode by a driver and an autonomous driving mode, and includes a first load circuit 1, a second load circuit 2, a main relay 4, an additional relay 5, and a controller 6. The first load circuit 1 operates using electric power from a lead battery 11 or an alternator 14, and is connected to a load actuator 12 and a starter motor 13 (each corresponding to a "first load") that are necessary to continue the normal driving mode. The second load circuit 2 operates using electric power from the lead battery 11 or a lithium ion battery 21, and is connected to an EPS actuator 22, an ABS actuator 23, and an ADAS actuator 24 (each corresponding to a "second load") that are necessary to continue the autonomous driving mode. The main relay 4 (corresponding to a first relay) is provided on a power supply line 3 for electrically connecting the first load circuit 1 and the second load circuit 2 to electrically connect or disconnect the first load circuit 1 to or from the second load circuit 2. The additional relay 5 (corresponding to a second relay) electrically connects or disconnects each load included in the second load circuit 2 to or from the lithium ion battery 21. In the present embodiment, in a case where the controller 6 determines that the driving mode of the vehicle is the normal driving mode (determined to be the normal driving mode in step S4 of FIG. 6A), when the circuit voltage of the second load circuit 2 is outside the predetermined voltage range (YES in step S13 of FIG. 6B), the controller 6 switches the additional relay 5 from on to off (step S14 of FIG. 6B). On the other hand, when the controller 6 determines that the driving mode of the vehicle is the autonomous driving mode (determined to be the autonomous driving mode in step S4 of FIG. 6A), the controller 6 maintains the on state of the additional relay 5 regardless of the circuit voltage of the second load circuit 2 (step S7 and step S8 of FIG. 6A).

For example, the method for controlling an autonomous vehicle power supply described in Patent Document 1 has a problem that the additional battery is discharged by a dark current of the load because the additional battery cannot be disconnected from the load. A problem to be solved by the present embodiment is to provide a power supply system and a method for controlling the power supply system to prevent an additional battery from being discharged by a dark current of a load. The power supply system 100 according to the present embodiment can solve the problem by the above-described means, and the second relay can electrically disconnect the load from the additional battery, making it possible to prevent the additional battery from being discharged by the dark current of the load.

Since the additional relay 5 can electrically disconnect each load included in the second load circuit 2 from the lithium ion battery 21, it is possible to prevent the lithium ion battery 21 from being discharged by the dark current of the load and prevent the remaining battery level of the lithium ion battery 21 from decreasing while the vehicle is in the parked state. As a result, even when a situation occurs in which the main relay 4 is turned off in a state where the vehicle can travel in the autonomous driving mode, the lithium ion battery 21 can supply electric power to continue autonomous travel to each load included in the second load circuit 2. Further, it is possible to prevent the lithium ion battery 21 from continuing to discharge in a state where it is an end-of-discharge voltage or lower, that is, prevent the so-called overdischarge of the lithium ion battery 21. As a result, the deterioration of the lithium ion battery 21 can be alleviated, and the battery life of the lithium ion battery 21 can be extended. In addition, with the additional relay 5 being provided, in the autonomous driving mode, there are concerns that the additional relay 5 may be suddenly turned off for some reason, causing the lithium-ion battery 21, which is a backup power supply source, and each load included in the second load circuit 2 to be electrically disconnected from each other. However, in the power supply system 100 and the method for controlling the power supply system 100 of the present embodiment, since the additional relay 5 maintains the on state in the autonomous driving mode, the lithium ion battery 21 and each load included in the second load circuit 2 can be prevented from being electrically disconnected from each other. In other words, according to the power supply system 100 and the method for controlling the power supply system 100 of the present embodiment, it is possible to prevent the remaining battery level of the lithium ion battery 21 from decreasing due to dark current discharge, and to ensure a backup operation of the lithium ion battery 21.

Further, in the present embodiment, when the controller 6 determines that the driving mode of the vehicle is the autonomous driving mode (determined to be the autonomous driving mode in step S4 of FIG. 6A), the controller 6 outputs a connection maintaining command for maintaining the on state (corresponding to a "first command") to the additional relay 5 (step S5 of FIG. 6A). Thus, since the additional relay 5 can maintain the on state in the autonomous driving mode, the electrically-connected state is maintained between the lithium ion battery 21 and the second load circuit 2. As a result, even when the main relay 4 is turned off in the autonomous driving mode, each load included in the second load circuit 2 allows the vehicle to continue autonomous travel.

Further, in the present embodiment, the connection maintaining command output to the additional relay 5 is a command to maintain the on state of the additional relay 5 regardless of the circuit voltage of the second load circuit 2 and the switching from on to off of the main relay 4 (step S5 of FIG. 6A). As a result, even when a signal corresponding to an opening control signal is input to the additional relay 5 due to the circuit voltage of the second load circuit 2 or the switching from on to off of the main relay 4, the additional relay 5 can maintain the on state.

Further, in the present embodiment, when the controller 6 determines that the driving mode of the vehicle is the normal driving mode (determined to be the normal driving mode in step S4 of FIG. 6A), the controller 6 outputs a cancellation command to the additional relay 5 to cancel the connection maintaining command (step S12 of FIG. 6B). This makes it possible to control on and off of the additional relay 5 using the opening/closing control signal in the normal driving mode. As a result, as in the present embodiment, when the controller 6 determines that the circuit voltage of the second load circuit 2 is outside the predetermined voltage range in the normal driving mode, the controller 6 can turn off the additional relay 5 (step S14 of FIG. 6B).

Further, in the present embodiment, the controller 6 acquires information on the state of the main relay 4 and the state of the additional relay 5, does not output an opening control signal to the main relay 4 when the additional relay 5 is in the off state, and does not output an opening control signal to the additional relay 5 when the main relay 4 is in the off state. This makes it possible to prevent both the main relay 4 and the additional relay 5 from being turned off and prevent the power supply to each load included in the second load circuit 2 from being interrupted. In addition, it is possible to prevent the power supply to the second load circuit 2 side from being cut off by simply monitoring the state of the main relay 4 and the state of the additional relay 5 without requiring complicated processing, making it possible to reduce a computation load on the controller 6 and improve the processing speed.

Further, in the present embodiment, the controller 6 determines whether or not the vehicle is in the parked state, and when it is determined that the vehicle is in the parked state, the controller 6 turns off the additional relay 5. Thus, since the lithium ion battery 21 and each load included in the second load circuit 2 are electrically disconnected from each other in the parked state of the vehicle, it is possible to prevent the lithium ion battery 21 from being discharged by the dark current of the load. Accordingly, it is possible to prevent the remaining battery level of the lithium ion battery 21 from decreasing due to dark current discharge, so that each load included in the second load circuit 2 can operate using the electric power from the lithium ion battery 21 according to the specifications. Further, the output voltage of the lithium ion battery 21 can be maintained at a voltage that allows each load to operate according to the specifications.

Further, in the present embodiment, when the additional relay 5 is in the off state, the controller 6 switches the additional relay 5 from off to on at the timing when it is detected that the vehicle speed is equal to or higher than a predetermined speed (step S3 of FIG. 6A). This makes it possible to electrically connect the lithium ion battery 21 and each load included in the second load circuit 2 in accordance with, for example, the start timing of the vehicle.

Further, in the present embodiment, the main relay 4 is a normally open type of relay, and the additional relay 5 is a normally closed type of relay. This makes it possible to turn off the main relay 4 in advance before the main relay 4 is electrically connected to the lead battery 11 and the alternator 14, for example, in vehicle manufacturing. Similarly, it is possible to turn on the additional relay 5 in advance before the additional relay 5 is electrically connected to the lithium ion battery 21. The state of each relay can be controlled in advance without requiring an opening/closing control signal.

In the embodiment described above, when the processing proceeds to step S11 through steps S8 to S10 in the flowchart of FIG. 6A, the additional relay 5 maintains the on state. However, the controller 6 may turn off the additional relay 5 depending on the remaining battery level of the lithium ion battery 21. In a case where the controller 6 determines that the driving mode of the vehicle is the autonomous driving mode, when the circuit voltage of the second load circuit 2 falls outside the predetermined voltage range, the controller 6 may switch the main relay 4 from on to off (step S8 of FIG. 6A); when the remaining battery level of the lithium ion battery 21 is a predetermined remaining level or lower after the driving mode of the vehicle is changed from the autonomous driving mode to the normal driving mode (step S10 of FIG. 6A), the controller 6 may switch the additional relay 5 from on to off. That is, in the present embodiment, in a case where the controller 6 determines that the driving mode is the autonomous driving mode, when the circuit voltage of the second load circuit 2 falls outside the predetermined voltage range, the controller 6 switches the main relay 4 from on to off; when the remaining battery level of the additional battery is a predetermined value or lower after the driving mode is changed from the autonomous driving mode to the normal driving mode, the controller 6 turns off the additional relay 5. For the calculation of the remaining battery level of the lithium ion battery 21 performed by the controller 6, a known calculation method known at the time of filing of this application can be used. Overdischarge of the lithium ion battery 21 can be prevented, and as a result, the deterioration of the lithium ion battery 21 can be alleviated, and the battery life of the lithium ion battery 21 can be extended.

Further, in the embodiment described above, a case has been illustrated in which the lead battery 11 is used as the main battery. However, as the main battery, a secondary battery such as a lithium ion battery and a nickel metal hydride battery may be used. Further, in the embodiment described above, a case has been illustrated in which the lithium ion battery 21 is used as the additional battery. However, as the additional battery, a plurality of batteries may be used, a set of a capacitor and a DC/DC converter may be used, or a nickel metal hydride battery may be used. Further, in the embodiment described above, a case has been illustrated in which the alternator 14 is used as the generator of the first load circuit 1. However, as the generator of the first load circuit 1, a generator, a motor generator, or the like may be used. Further, in the embodiment described above, a case has been illustrated in which the EPS actuator 22, the ABS actuator 23, and the ADAS actuator 24 are used as the loads included in the second load circuit 2. However, the loads necessary to continue the autonomous driving mode may be replaced depending on the specifications of the vehicle and the specifications of the driver assistance device. Further, in the embodiment described above, a case has been illustrated in which the additional relay 5 and the lithium ion battery 21 are not included in the second load circuit 2. However, the second load circuit 2 may include the additional relay 5 and the lithium ion battery 21. Further, in the embodiment described above, a case has been illustrated in which a semiconductor relay having the self-disconnection/connection function is used as the main relay 4. However, as the main relay 4, a semiconductor relay not having the self-disconnection/connection function, or a mechanical relay may be used. Further, in the embodiment described above, a case has been illustrated in which a mechanical relay is used as the additional relay 5. However, as the additional relay 5, a semiconductor relay may be used.

Further, in the embodiment described above, a case has been described by way of example in which the power supply system and the method for controlling the power supply system according to the present invention are applied to a vehicle having a hands-off mode of driving assist level 2. However, the power supply system and the method for controlling the power supply system according to the present invention can also be applied to a vehicle having driving assist level 3.

Further, in the embodiment described above, a case has been described by way of example in which the power supply system and the method for controlling the power supply system according to the present invention are applied to a vehicle with an engine serving as a drive source (engine vehicle). However, the power supply system and the method for controlling the power supply system according to the present invention can also be applied to a vehicle with a battery serving as a drive source (electric vehicle), a vehicle with an engine and a battery serving as drive sources (hybrid vehicle), and a vehicle with a fuel cell serving as a drive source (fuel cell vehicle). In summary, they can be applied to a vehicle in which a power supply system is installed, and the power supply system includes: a first load circuit configured to operate using electric power from a main battery, the first load circuit being connected to a first load necessary to continue a normal driving mode; a second load circuit configured to operate using electric power from an additional battery, the second load circuit being connected to a second load necessary to continue an autonomous driving mode; a first relay provided on a power supply line for electrically connecting the first load and the second load, the first relay being configured to electrically connect or disconnect the first load circuit to or from the second load circuit; a second relay configured to electrically connect or disconnect the second load to or from the additional battery; and a controller configured to determine a driving mode of the vehicle.

Further, in the embodiment described above, a control procedure has been described by way of example in which the driving mode of the vehicle is changed from the autonomous driving mode to the normal driving mode in step S10 of FIG. 6A and then the processing proceeds to step S11. However, after the process of step S10, the processing may proceed to step S12 illustrated in FIG. 6B, as in the case where it is determined in step S4 that the driving mode of the vehicle is the normal driving mode.

Further, in the embodiment described above, a case has been described in which it is determined whether or not the circuit voltage of the second load circuit 2 is outside the predetermined voltage range in step S6 of FIG. 6A and step S13 and step S15 of FIG. 6B. However, since in any of the steps, the first load circuit 1 and the second load circuit 2 are electrically connected to each other by the main relay 4, the controller 6 may determine in each step whether or not the circuit voltage of the first load circuit 1 is outside the predetermined voltage range. Further, in the embodiment described above, a case has been described in which when the circuit voltage of the second load circuit 2 is outside the predetermined voltage range in step S13 of FIG. 6B, the controller 6 switches the additional relay 5 from on to off. However, the condition for switching the additional relay 5 from on to off with the driving mode of the vehicle being the normal driving mode may be that the current flowing through the additional relay 5 is equal to or higher than a predetermined current threshold value. For example, when it is determined that the driving mode of the vehicle is the normal driving mode (determined to be the normal driving mode in step S4 of FIG. 6A), the controller 6 compares the current flowing through the additional relay 5 with the predetermined current threshold value based on the detection result from the current sensor 61. The direction of the current flowing through the additional relay 5 is not particularly limited, and the controller 6 compares the absolute value of the current flowing through the additional relay 5 with the predetermined current threshold value. The unit of the predetermined current threshold value is electric current, and the predetermined current threshold value is a current threshold value defined based on the contact life of the additional relay 5. When the absolute value of the current flowing through the additional relay 5 is equal to or higher than the predetermined current threshold value, the controller 6 outputs an opening control signal to the additional relay 5. Thus, when an excessive current flows through the additional relay 5 in the normal driving mode, the rate at which the contacts of the additional relay 5 wear out can be reduced by switching the additional relay 5 from on to off.

Further, in the embodiment described above, as the condition for the controller 6 to turn off the main relay 4 in step S6 of FIG. 6A, a condition has been described by way of example that the circuit voltage of the second load circuit 2 is outside the predetermined voltage range. However, when the circuit voltage of the second load circuit 2 is lower than the lower limit value of the predetermined voltage range or the circuit voltage of the second load circuit 2 is higher than the upper limit value of the predetermined voltage range in step S6, the controller 6 may turn off the main relay 4. Similarly, in the embodiment described above, as the condition for the controller 6 to turn off the additional relay 5 in step S13 of FIG. 6B, a condition has been described by way of example that the circuit voltage of the second load circuit 2 is outside the predetermined voltage range. However, when the circuit voltage of the second load circuit 2 is lower than the lower limit value of the predetermined voltage range or the circuit voltage of the second load circuit 2 is higher than the upper limit value of the predetermined voltage range in step S13, the controller 6 may turn off the additional relay 5.

Third Embodiment

Next, a third embodiment will be described with reference to the drawings. In the present embodiment, the method for controlling the main relay 4 and the additional relay 5 by the controller is different from the first embodiment, but the other configurations are the same as the first embodiment. Below, parts that are different from the first embodiment will be described, parts having the same configuration as the first embodiment will be given the same reference numerals, and thus, the description thereof will be omitted while the description of the first and second embodiments will be used as appropriate.

In a power supply system 100 according to the third embodiment, the load 26 is omitted from the power supply system 100 according to the first embodiment, and the power supply system 100 according to the third embodiment has the same configuration as the power supply system 100 according to the second embodiment. Note that, in the present embodiment, the main relay 4 will be described using as an example a semiconductor relay having a self-diagnosis function that autonomously performs a failure diagnosis in addition to the self-disconnection/connection function. When a failure diagnosis start signal is input from the controller 6 to the main relay 4, the main relay 4 performs a failure diagnosis using the self-diagnosis function. In the present embodiment, the failure diagnosis for the main relay 4 will be described using as an example a diagnosis of whether or not a stuck-on condition in which the main relay 4 is stuck in the on state has occurred (also referred to as a stuck-on failure diagnosis or a short-circuit failure diagnosis). The stuck-on failure diagnosis for the main relay 4 will be described later. Further, the controller 6 executes processing based on input information, and performs a failure diagnosis for the main relay 4 based on the execution result. Further, as in the present embodiment, in a case where the main relay 4 is a semiconductor relay having the self-diagnosis function, the detection result by the current sensor 61 is also output to the main relay 4.

Figure 7A:
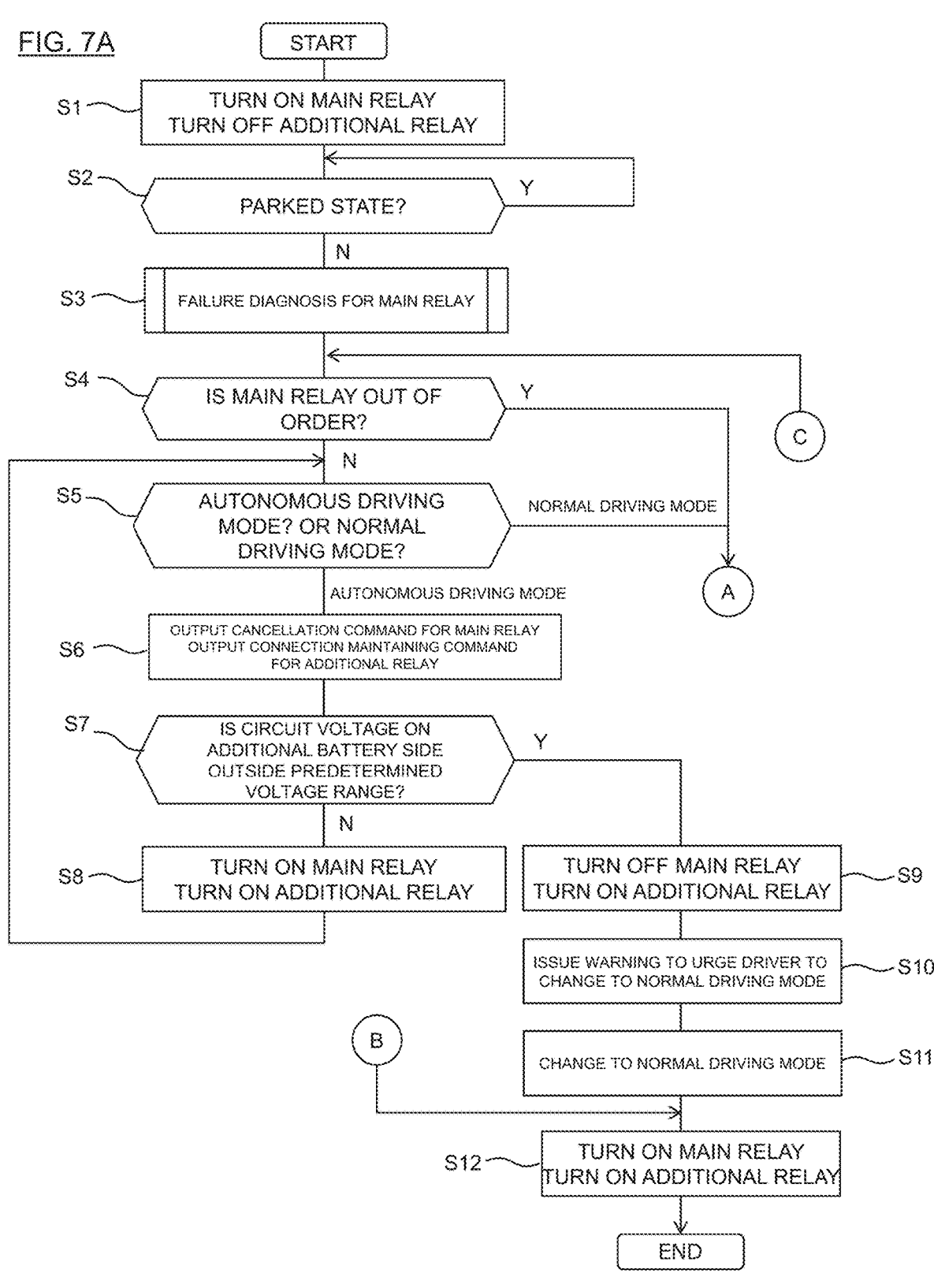
FIG. 7A is a flowchart illustrating an example of a procedure of a method for controlling a power supply system executed by a controller according to a third embodiment.
Figure 7B:
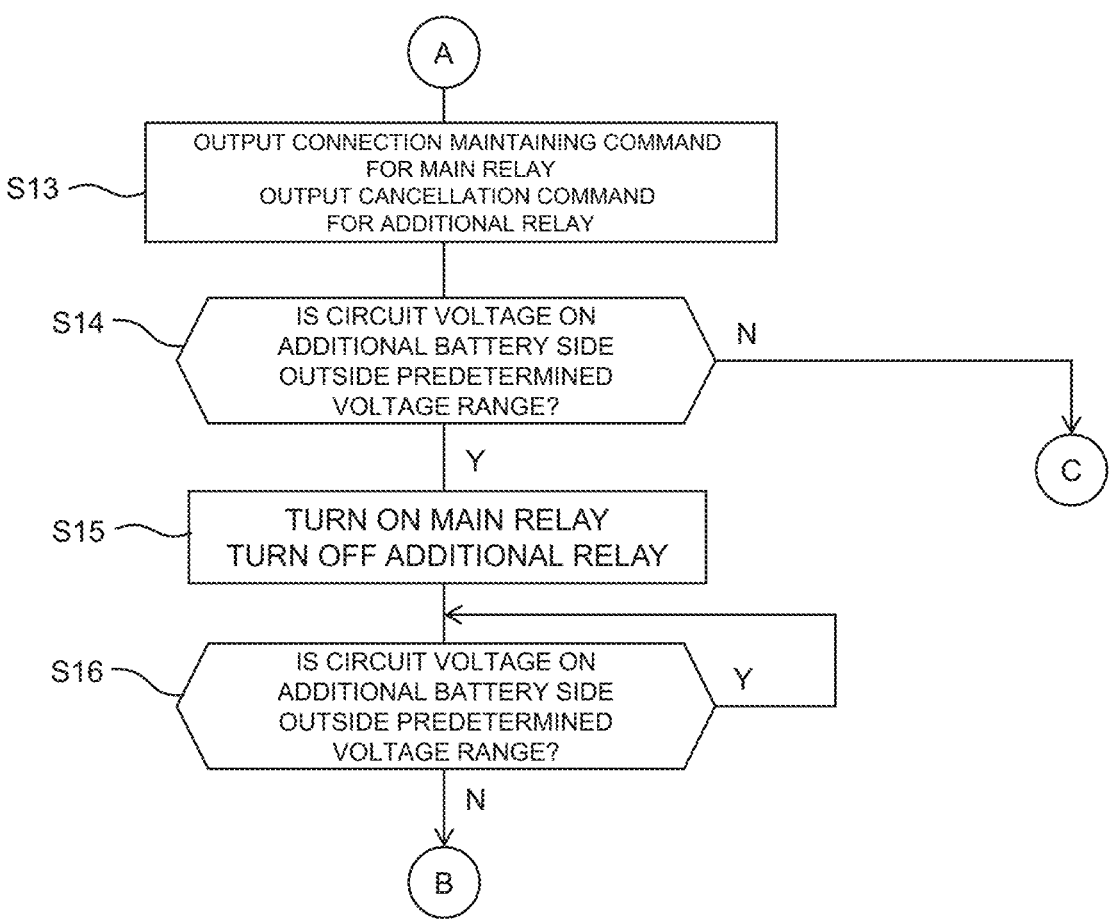
FIG. 7B is a flowchart illustrating an example of the procedure of the method for controlling the power supply system executed by the controller according to the third embodiment.

Next, the functions implemented by the controller 6 will be described with reference to FIGS. 7A, 7B, and 8. FIGS. 7A and 7B are flowcharts illustrating an example of the procedure of the method for controlling the power supply system 100 executed by the controller 6 illustrated in FIG. 1. Note that this procedure of the controlling method is started from a state where the ignition switch 68 is turned off (parked state of the vehicle).

In step S1, the controller 6 outputs a closing control signal to turn on a relay (hereinafter simply referred to as a closing control signal) to the main relay 4, and outputs an opening control signal to turn off a relay (hereinafter simply referred to as an opening control signal) to the additional relay 5. When the additional relay 5 is electrically connected to each load included in the second load circuit 2 in the parked state of the vehicle, the lithium ion battery 21 is discharged by the dark current of the load. By the process of this step, the additional relay 5 is electrically disconnected from each load included in the second load circuit 2, so that it is possible to prevent the lithium ion battery 21 from being discharged by the dark current of the load.

The processing to be performed by the controller 6 before the opening control signal is output to the main relay 4 or the additional relay 5 in the flowcharts illustrated in FIGS. 7A and 7B will now be described. In the present embodiment, the controller 6 performs opening/closing control of the main relay 4 and the additional relay 5 to turn on at least one of the main relay 4 and the additional relay 5. Specifically, the controller 6 acquires information on the state of the main relay 4 and the state of the additional relay 5, does not output the opening control signal to the main relay 4 when the additional relay 5 is in the off state, and does not output the opening control signal to the additional relay 5 when the main relay 4 is in the off state. This processing is to prevent both the main relay 4 and the additional relay 5 from being turned off and prevent the power supply to each load included in the second load circuit 2 from being interrupted.

Figure 8:
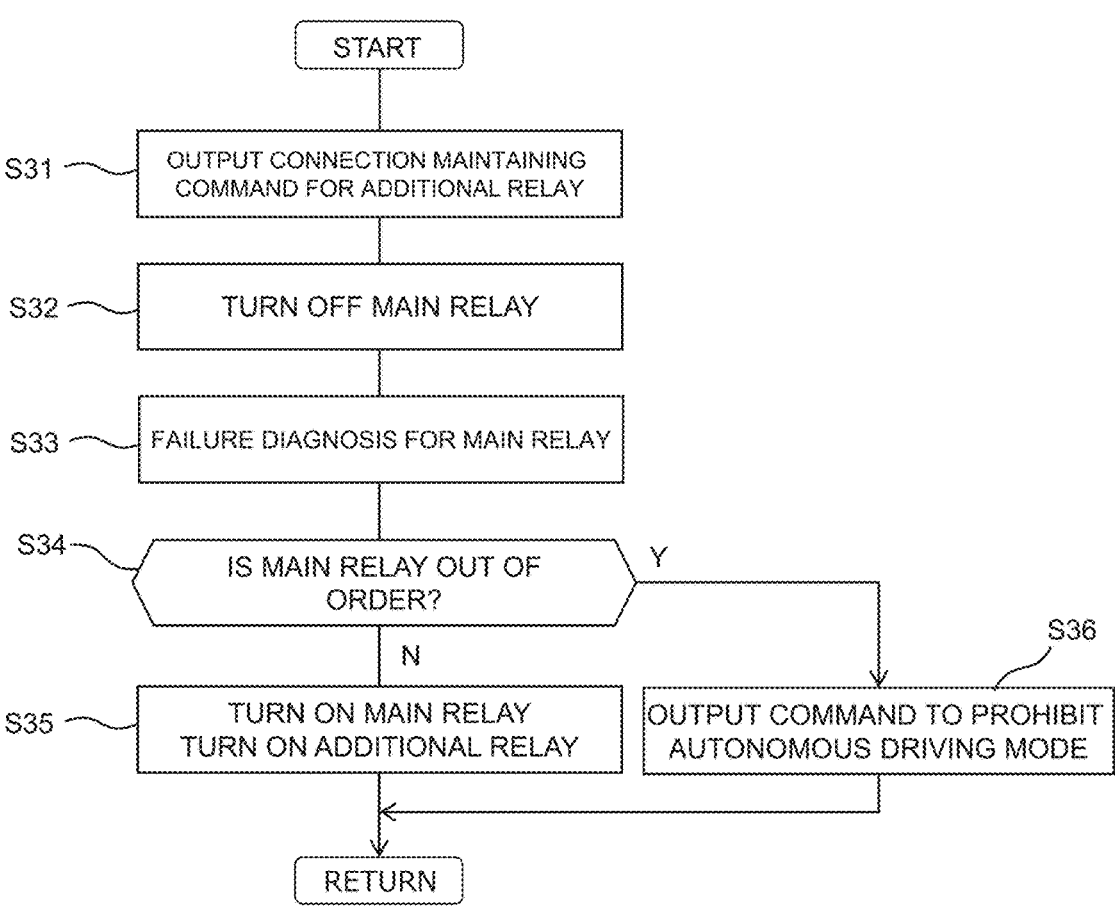
FIG. 8 is a flowchart illustrating an example of a subroutine of step S3 illustrated in FIG. 7A.

After proceeding to step S3, the processing of the controller 6 further proceeds to step S31 in a subroutine illustrated in FIG. 8. FIG. 8 is a flowchart illustrating an example of the subroutine of step S3 illustrated in FIG. 7A.

In step S31, the controller 6 outputs a connection maintaining command to the additional relay 5. The additional relay 5 is switched from off to on according to the connection command, and the lithium ion battery 21 and the power supply line 3 on the second load circuit 2 side are electrically connected to each other accordingly. As described in connection with the additional relay 5, the connection maintaining command is a command that has a compulsory force to maintain the on state. Therefore, for example, even when an opening/closing control signal is input to the additional relay 5 for some reason, in a case where the connection maintaining command has been input to the additional relay 5 before that, the additional relay 5 ignores the input opening/closing control signal and forcibly maintains the on state according to the connection maintaining command. In this step, before the failure diagnosis for the main relay 4 is performed, the controller 6 maintains the on state of the additional relay 5. Further, until the controller 6 outputs a cancellation command to the additional relay 5, the controller 6 outputs the connection maintaining command to the additional relay 5 at predetermined intervals (e.g., every 100 ms). This makes it possible to further reduce the possibility that the additional relay 5 is turned off while the failure diagnosis for the main relay is performed in step S33, which will be described later.

In step S32, the controller 6 outputs an opening control signal to the main relay 4. When a stuck-on failure has not occurred in the main relay 4, the main relay 4 is switched from on to off, and the first load circuit 1 is electrically disconnected from the second load circuit 2 accordingly. Even when the first load circuit 1 is electrically disconnected from the second load circuit 2 by the main relay 4 being turned off, the voltage of the lithium ion battery 21 is applied to the terminal of the main relay 4 on the second load circuit 2 side by the process of step S31. Further, the voltage of the lithium ion battery 21 is applied to each load included in the second load circuit 2. On the other hand, when a stuck-on failure has occurred in the main relay 4, the main relay 4 is not switched from on to off, and the electrically-connected state is maintained between the first load circuit 1 and the second load circuit 2.

In step S33, the controller 6 outputs a failure diagnosis start signal to the main relay 4. In the present embodiment, the main relay 4 uses the input of the failure diagnosis start signal as a trigger to perform the failure diagnosis using the self-diagnosis function. For example, the main relay 4 determines, based on the detection results of the first voltage sensor 63 and the second voltage sensor 64, whether or not a voltage difference between the circuit voltage of the first load circuit 1 and the circuit voltage of the second load circuit 2 is equal to or higher than a predetermined determination voltage. The determination voltage is a voltage threshold value defined for determining a stuck-on failure of a relay. When the voltage difference between the circuit voltage of the first load circuit 1 and the circuit voltage of the second load circuit 2 is equal to or higher than the predetermined determination voltage, the main relay 4 determines that a stuck-on failure has not occurred. On the other hand, when the voltage difference between the circuit voltage of the first load circuit 1 and the circuit voltage of the second load circuit 2 is lower than the predetermined determination voltage, the main relay 4 determines that a stuck-on failure has occurred. For example, the main relay 4 may determine, based on the detection result of the current sensor 61, whether or not a current is flowing in a direction from the first load circuit 1 side to the second load circuit 2 side via the main relay 4. When a current is flowing from the first load circuit 1 side to the second load circuit 2 side via the main relay 4, the main relay 4 determines that a stuck-on failure has occurred. On the other hand, when a current is not flowing from the first load circuit 1 side to the second load circuit 2 side via the main relay 4, the main relay 4 determines that a stuck-on failure has not occurred. The result of the failure diagnosis performed by the main relay 4 is output to the controller 6.

In step S34, the controller 6 determines, based on the result of the failure diagnosis in step S33, whether or not the main relay 4 is out of order. When the failure diagnosis result in step S33 indicates that a stuck-on failure has not occurred, the controller 6 determines that the main relay 4 is not out of order. On the other hand, when the failure diagnosis result in step S33 indicates that a stuck-on failure has occurred, the controller 6 determines that the main relay 4 is out of order. When the controller 6 makes a negative determination, the processing proceeds to step S35, and when the controller 6 makes an affirmative determination, the processing proceeds to step S36.

In step S35, the controller 6 outputs a closing control signal to the main relay 4 and the additional relay 5. Further, the controller 6 outputs a cancellation command to the additional relay 5 with respect to the connection maintaining command output in step S31. Since the connection maintaining command has been input to the additional relay 5 through the process of step S31, the controller 6 may not output the closing control signal to the additional relay 5. When the process of step S35 is completed, the subroutine illustrated in FIG. 8 is exited, and the processing proceeds to step S4 illustrated in FIG. 7A.

When an affirmative determination is made in step S34, the processing proceeds to step S36. In step S36, the controller 6 outputs a command to the advanced driver assistance system 70 to prohibit the driving mode of the vehicle from being set to the autonomous driving mode. When the advanced driver assistance system 70 acquires an autonomous driving mode setting prohibition command, the advanced driver assistance system 70 disables an on signal from the autonomous driving mode switch 62, for example. Further, the controller 6 may output a warning indicator signal to the display device 71 to notify the driver that the autonomous driving mode is prohibited from being set because of a failure of the main relay 4. Further, the controller 6 may output a warning sound signal to the buzzer 72. Further, the controller 6 may output a warning indicator signal to the display device 71 and also output a warning sound signal to the buzzer 72. This is because it is determined that the main relay 4 is out of order and the vehicle is prohibited from traveling in the autonomous driving mode accordingly. When the process of step S36 is completed, the subroutine illustrated in FIG. 8 is exited, and the processing proceeds to step S4 illustrated in FIG. 7A.

When the process of step S35 or step S36 in FIG. 8 is completed, the processing proceeds to step S4 in FIG. 7A. In step S4, the controller 6 determines whether or not the main relay 4 is out of order. For example, the controller 6 refers to the determination result in step S34 in FIG. 8 to determine whether or not the main relay 4 is out of order. When the controller 6 makes an affirmative determination, the processing proceeds to step S13 illustrated in FIG. 7B, and when the controller 6 makes a negative determination, the processing proceeds to step S5. In the present embodiment, the vehicle can travel not only when the ignition switch 68 is in the on state but also when the failure diagnosis for the main relay 4 is completed. In other words, the process of step S3 is performed in the parked state of the vehicle as it is the failure diagnosis for the vehicle.

In step S5, the controller 6 determines whether the driving mode of the vehicle is the autonomous driving mode or the normal driving mode. For example, when the controller 6 acquires the on signal from the autonomous driving mode switch 62, the controller 6 may determine that the driving mode of the vehicle is the autonomous driving mode. Further, when the controller 6 detects the output of a control signal for operating each load included in the second load circuit 2, the controller 6 may determine that the driving mode of the vehicle is the autonomous driving mode. Further, when the controller 6 acquires a signal indicating that each load included in the second load circuit 2 is in operation, the controller 6 may determine that the driving mode of the vehicle is the autonomous driving mode. When any one of the above-described examples applies, the controller 6 determines that the driving mode of the vehicle is the autonomous driving mode. On the other hand, when none of the above-described examples applies, the controller 6 determines that the driving mode of the vehicle is the normal driving mode. When it is determined that the driving mode of the vehicle is the autonomous driving mode, the processing proceeds to step S6, and when it is determined that the driving mode of the vehicle is the normal driving mode, the processing proceeds to step S13 illustrated in FIG. 7B.

Note that a method for determining that the driving mode of the vehicle is the normal driving mode has been described using as an example a method for determining that the driving mode of the vehicle is not the autonomous driving mode. However, it may be determined that the driving mode of the vehicle is the normal driving mode in any other way. For example, when the controller 6 acquires an off signal from the autonomous driving mode switch 62, the controller 6 may determine that the driving mode of the vehicle is the normal driving mode. Further, when the controller 6 acquires a signal of a brake operation by the driver from the brake switch 66, the controller 6 may determine that the driving mode of the vehicle is the normal driving mode. Further, when the controller 6 acquires a signal of a steering operation by the driver from the torque sensor 67, the controller 6 may determine that the driving mode of the vehicle is the normal driving mode. When any one of the above-described examples applies, the controller 6 may determine that the driving mode of the vehicle is the normal driving mode. Further, the controller 6 may acquire a driving mode signal indicating the driving mode of the vehicle from the advanced driver assistance system 70, and determine, based on the driving mode signal, whether the driving mode of the vehicle is the autonomous driving mode or the normal driving mode. For example, when the advanced driver assistance system 70 acquires the on signal from the autonomous driving mode switch 62, the advanced driver assistance system 70 determines that the driving mode of the vehicle is the autonomous driving mode. Further, when the advanced driver assistance system 70 acquires an off signal from the autonomous driving mode switch 62, the advanced driver assistance system 70 determines that the driving mode of the vehicle is the normal driving mode. The controller 6 may determine whether the driving mode of the vehicle is the autonomous driving mode or the normal driving mode according to the driving mode signal acquired from the advanced driver assistance system 70.

In step S6, the controller 6 outputs a cancellation command to the main relay 4, and outputs a connection maintaining command to the additional relay 5. When it is determined that the driving mode of the vehicle is the autonomous driving mode, in this step, the controller 6 maintains the on state of the additional relay 5. Further, until the controller 6 outputs a cancellation command to the additional relay 5, the controller 6 outputs the connection maintaining command to the additional relay 5 at predetermined intervals (e.g., every 100 ms). This makes it possible to further reduce the possibility that the additional relay 5 is turned off in the autonomous driving mode. On the other hand, the controller 6 outputs the cancellation command to the main relay 4 so the main relay 4 can be controlled by an opening/closing control signal. In a case where the main relay 4 is a semiconductor relay having the self-disconnection/connection function as in the present embodiment, the self-disconnection/connection function of the main relay 4 is enabled by the cancellation command.

In step S7, the controller 6 determines whether or not a voltage abnormality has occurred in the power supply system 100 based on the circuit voltage of the second load circuit 2. The controller 6 determines, based on the detection result of the second voltage sensor 64, whether or not the circuit voltage on the additional battery side (circuit voltage of the second load circuit 2) is outside a predetermined voltage range. The predetermined voltage range is a range using a unit of voltage and is also a predetermined range. The upper limit value of the predetermined voltage range is a voltage value defined to prevent overvoltage from being applied to each load included in the second load circuit 2, and the lower limit value of the predetermined range is a voltage value defined to operate each load included in the second load circuit 2 according to the specifications. When the controller 6 makes a negative determination, that is, when it is determined that a voltage abnormality has not occurred in the power supply system 100, the processing proceeds to step S8. On the other hand, when the controller 6 makes an affirmative determination, that is, when it is determined that a voltage abnormality has occurred in the power supply system 100, the processing proceeds to step S9.

In step S8, the controller 6 outputs a closing control signal to the main relay 4 and the additional relay 5. Note that in the example of FIG. 7A, step S8 is illustrated for comparison with step S9. However, since the main relay 4 and the additional relay 5 are turned on by the process of step S3, the controller 6 may skip the process of step S8. When the process of step S8 is completed, the processing returns to step S5 to determine the driving mode of the vehicle again. When a voltage abnormality does not occur in the power supply system 100 in a state where the vehicle can travel in the autonomous driving mode, the processes of steps S5 to S8 are repeatedly executed, so that both the main relay 4 and the additional relay 5 maintain the on state.

When an affirmative determination is made in step S7, processing proceeds to step S9. In step S9, the controller 6 outputs an opening control signal to the main relay 4, and outputs a closing control signal to the additional relay 5. When the circuit voltage of the second load circuit 2 falls outside the predetermined voltage range in the autonomous driving mode, the main relay 4 is switched from on to off. On the other hand, even when the circuit voltage of the second load circuit 2 is outside the predetermined voltage range in the autonomous driving mode, the additional relay 5 maintains the on state through of the process of step S6, regardless of the circuit voltage of the second load circuit 2. By switching the main relay 4, the power supply from the first load circuit 1 side to each load included in the second load circuit 2 is cut off. However, since the additional relay 5 maintains the on state, each load included in the second load circuit 2 is supplied with electric power from the lithium ion battery 21. In other words, in the autonomous driving mode, each load included in the second load circuit 2 can continue to operate with the electric power from the lithium ion battery 21 even when the power supply from the first load circuit 1 side is cut off. Note that, since the connection maintaining command has been input to the additional relay 5 through the process of step S6, the controller 6 may not output the closing control signal to the additional relay 5.

Further, in the case where the main relay 4 is a semiconductor relay having the self-disconnection/connection function as in the present embodiment, the switching from on to off of the main relay 4 may be performed by the self-disconnection/connection function of the main relay 4. For example, when the main relay 4 detects that the circuit voltage of the second load circuit 2 (the terminal voltage of the main relay 4 connected to the second load circuit 2) is outside the predetermined voltage range based on the detection result from the second voltage sensor 64, the main relay 4 may be switched from on to off using the self-disconnection/connection function. It is faster for the main relay 4 to be switched from on to off using the self-disconnection/connection function than for the opening control signal to be transmitted from the controller 6 to the main relay 4. Therefore, it is possible to further shorten the time during which the circuit voltage of the second load circuit 2 is outside the predetermined voltage range, and thus to further protect each load included in the second load circuit 2.

In step S10, the controller 6 outputs a warning indicator signal to the display device 71 to notify the driver that an abnormality has occurred in the autonomous driving mode. Further, the controller 6 may output a warning sound signal to the buzzer 72. Further, the controller 6 may output a warning indicator signal to the display device 71, and also output a warning sound signal to the buzzer 72. The process of this step urges the driver to change the driving mode from the autonomous driving mode to the normal driving mode. In other words, this step is a step for requesting the driver to take back the driving control that is being performed by the driver assistance device. Since the additional relay 5 maintains the on state by the process of step S6, each load included in the second load circuit 2 operates with the electric power from the lithium ion battery 21, and the autonomous travel of the vehicle in the autonomous driving mode continues.

Since the condition for canceling the autonomous driving mode is operational intervention by the driver, when the driver performs driving operations, such as a brake operation, an accelerator operation, and a steering operation, the controller 6 determines in step S11 that the driving mode of the vehicle has changed from the autonomous driving mode to the normal driving mode. For example, when the controller 6 acquires a signal of a brake operation by the driver from the brake switch 66 or acquires a signal of a steering operation by the driver from the torque sensor 67, the controller 6 determines that the autonomous driving mode has been canceled and the driving mode of the vehicle has changed to the normal driving mode.

In step S12, the controller 6 outputs a closing control signal to the main relay 4 and the additional relay 5. Since the connection maintaining command has been input to the additional relay 5 through the process of step S6, the controller 6 may not output the closing control signal to the additional relay 5. Further, the controller 6 may output a cancellation command to the additional relay 5 with respect to the connection maintaining command output in step S6. When the process of step S12 is completed, the controller 6 ends the processing illustrated in FIGS. 7A and 7B.

When it is determined in step S5 that the driving mode of the vehicle is the normal driving mode, the processing proceeds to step S13 illustrated in FIG. 7B. In step S13, the controller 6 outputs a connection maintaining command to the main relay 4, and outputs a cancellation command to the additional relay 5. As described in connection with the main relay 4, the connection maintaining command is a command that has a compulsory force to maintain the on state. Therefore, for example, even when an opening/closing control signal is input to the main relay 4 for some reason, in a case where the connection maintaining command has been input to the main relay 4 before that, the main relay 4 ignores the input opening/closing control signal and forcibly maintains the on state according to the connection maintaining command. When it is determined that the driving mode of the vehicle is the normal driving mode, in this step, the controller 6 maintains the on state of the main relay 4. Further, until the controller 6 outputs a cancellation command to the main relay 4, the controller 6 outputs the connection maintaining command to the main relay 4 at predetermined intervals (e.g., every 100 ms). This makes it possible to further reduce the possibility that the main relay 4 is turned off in the normal driving mode. In the case where the main relay 4 is a semiconductor relay having the self-disconnection/connection function as in the present embodiment, the self-disconnection/connection function of the main relay 4 is disabled in this step, so that the main relay 4 can be prevented from being switched from on to off by the self-disconnection/connection function. On the other hand, the controller 6 outputs the cancellation command to the additional relay 5 so that the additional relay 5 can be controlled by an opening/closing control signal.

In step S14, the controller 6 determines whether or not a voltage abnormality has occurred in the power supply system 100 based on the circuit voltage of the second load circuit 2. Step S14 corresponds to step S7, and thus, the description of step S7 will be referred to for the description of step S14. When the controller 6 makes a negative determination, that is, when it is determined that a voltage abnormality has not occurred in the power supply system 100, the processing returns to step S4 illustrated in FIG. 7A. On the other hand, when the controller 6 makes an affirmative determination, that is, when it is determined that a voltage abnormality has occurred in the power supply system 100, the processing proceeds to step S15.

When a negative determination is made in step S14, the processing returns to step S4 to determine again whether or not the main relay 4 is out of order. Regardless of whether or not the main relay 4 is out of order, when a voltage abnormality does not occur in the power supply system 100 in a state where the vehicle can travel in the normal driving mode, the processes of step S4 (step S5), step S13, and step S14 are repeatedly executed, so that both the main relay 4 and the additional relay 5 maintain the on state. Note that when the ignition switch 68 is turned off while the processes of step S4 (step S5), step S13, and step S14 are being repeatedly executed, the controller 6 determines that the vehicle has changed from the travel-ready state to the parked state, outputs a closing control signal to the main relay 4, and outputs an opening control signal to the additional relay 5, as with the process of step S1. The additional relay 5 is switched from on to off while the main relay 4 maintains the on state.

A possible state of the power supply system 100 brought about in a case where the additional relay 5 is switched from on to off from a state where the first load circuit 1 and the second load circuit 2 are electrically connected to each other, and a current is flowing from the first load circuit 1 side to the second load circuit side accordingly will now be described. For example, while the processes of step S5, step S13, and step S14 are repeatedly executed, the main relay 4 and the additional relay 5 both maintain the on state, and thus, a current from the first load circuit 1 side is input to the lithium ion battery 21 via the additional relay 5. In the case where the additional relay 5 is a mechanical relay as in the present embodiment, when the additional relay 5 is switched from on to off, a back electromotive force is generated in the additional relay 5 in order to maintain the current flowing through a coil of the mechanical relay. The back electromotive force turns to a surge voltage that occurs instantaneously, and is input to the main relay 4 via the power supply line 3. In the case where the main relay 4 is a semiconductor relay having the self-disconnection/connection function as in the present embodiment, the main relay 4 may be switched from on to off by the self-disconnection/connection function in response to detecting the surge voltage. However, the main relay 4 maintains the on state because the self-disconnection/connection function is disabled through the process of step S13. Therefore, even when the surge voltage is input to the main relay 4 due to the switching of the additional relay 5 from on to off, the main relay 4 can be prevented from being switched from on to off. This makes it possible for each load included in the second load circuit 2 to continue to be supplied with electric power from the first load circuit 1 side, maintaining the circuit voltage of the second load circuit 2.

Returning to FIG. 7B, when an affirmative determination is made in step S14, the processing proceeds to step S15. In step S15, the controller 6 outputs a closing control signal to the main relay 4, and outputs an opening control signal to the additional relay 5. When the circuit voltage of the second load circuit 2 falls outside the predetermined voltage range in the normal driving mode, the additional relay 5 is switched from on to off. On the other hand, even when the circuit voltage of the second load circuit 2 is outside the predetermined voltage range in the normal driving mode, the main relay 4 maintains the on state through the process of step S13, regardless of the circuit voltage of the second load circuit 2. As described above, since the additional relay 5 is switched from on to off with the main relay 4 being in the on state, a surge voltage may occur due to the switching of the additional relay 5 in this step as well. However, the main relay 4 maintains the on state through the process of step S13. Note that, since the connection maintaining command has been input to the main relay 4 through the process of step S13, the controller 6 may not output the closing control signal to the main relay 4.

In step S16, the controller 6 determines, based on the circuit voltage of the second load circuit 2, whether or not or not the voltage abnormality that occurred in step S14 continues. Step S16 corresponds to step S7 and step 14, and thus, the description of step S7 and step 14 will be referred to for the description of step S16. When the controller 6 makes a negative determination, that is, when it is determined that a voltage abnormality has not occurred in the power supply system 100, the processing proceeds to step S12 illustrated in FIG. 7A. On the other hand, when the controller 6 makes an affirmative determination, that is, when it is determined that the voltage abnormality continues to occur in the power supply system 100, the controller 6 waits in step S16 for an affirmative determination.

When the ignition switch 68 is turned off while the controller 6 waits in step S16, the controller 6 determines that the vehicle has changed from the travel-ready state to the parked state, outputs a closing control signal to the main relay 4, and outputs an opening control signal to the additional relay 5, as with the process of step S1. Further, the controller 6 may output a cancellation command to the main relay 4 with respect to the connection maintaining command output in step S13.

When a negative determination is made in step S16, the processing proceeds to step S12 illustrated in FIG. 7A, and in step S12, the controller 6 outputs a closing control signal to the main relay 4 and the additional relay 5. Since the connection maintaining command has been input to the main relay 4 through the process of step S13, the controller 6 may not output the closing control signal to the main relay 4. Further, the controller 6 may output a cancellation command to the main relay 4 with respect to the connection maintaining command output in step S13. When the process of step S12 is completed, the controller 6 ends the processing illustrated in FIGS. 7A and 7B.

Note that when the processing proceeds from step S16 to step S12 and the ignition switch 68 is then turned off, the controller 6 determines that the vehicle has changed from the travel-ready state to the parked state, outputs a closing control signal to the main relay 4, and outputs an opening control signal to the additional relay 5, as with the process of step S1. Further, the controller 6 may output a cancellation command to the main relay 4 with respect to the connection maintaining command output in step S13.

As described above, the power supply system 100 according to the present embodiment is a power supply system installed in a vehicle that has a normal driving mode by a driver and an autonomous driving mode, and includes a first load circuit 1, a second load circuit 2, a main relay 4, an additional relay 5, and a controller 6. The first load circuit 1 operates using electric power from a lead battery 11 or an alternator 14, and is connected to a load actuator 12 and a starter motor 13 (each corresponding to a "first load") that are necessary to continue the normal driving mode. The second load circuit 2 operates using electric power from the lead battery 11 or a lithium ion battery 21, and is connected to an EPS actuator 22, an ABS actuator 23, and an ADAS actuator 24 (each corresponding to a "second load") that are necessary to continue the autonomous driving mode. The main relay 4 (corresponding to a "first relay") is provided on a power supply line 3 for electrically connecting the first load circuit 1 and the second load circuit 2 to electrically connect or disconnect the first load circuit 1 to or from the second load circuit 2. The additional relay 5 (corresponding to a "second relay") electrically connects or disconnects each load included in the second load circuit 2 to or from the lithium ion battery 21. In the present embodiment, when the ignition switch 68 is off, the main relay 4 is in an on state, and when the ignition switch 68 is off, the additional relay 5 is in an off state. When the controller 6 determines that the ignition switch 68 has been switched from off to on (YES in step S2 in FIG. 7A), the controller 6 turns on the additional relay 5 (step S31 in FIG. 8), and then turns off the main relay 4 (step S32 in FIG. 8). The failure diagnosis for the main relay 4 is performed with the main relay 4 being off and the additional relay 5 being on (step S33 in FIG. 8).

For example, the method for controlling an autonomous vehicle power supply described in Patent Document 1 has a problem that the additional battery is discharged by a dark current of the load because the additional battery cannot be disconnected from the load. A problem to be solved by the present embodiment is to provide a power supply system and a method for controlling the power supply system to prevent an additional battery from being discharged by a dark current of a load. The power supply system 100 according to the present embodiment can solve the problem by the above-described means, and the second relay can electrically disconnect the load from the additional battery, making it possible to prevent the additional battery from being discharged by the dark current of the load.

Since the additional relay 5 can electrically disconnect each load included in the second load circuit 2 from the lithium ion battery 21, it is possible to prevent the lithium ion battery 21 from being discharged by a dark current of the load and prevent the remaining battery level of the lithium ion battery 21 from decreasing while the vehicle is in the parked state. As a result, even when a situation occurs in which the main relay 4 is turned off in a state where the vehicle can travel in the autonomous driving mode, the lithium ion battery 21 can supply electric power to continue autonomous travel to each load included in the second load circuit 2. Further, it is possible to prevent the lithium ion battery 21 from continuing to discharge in a state where it is a start-end-of-discharge voltage or lower, that is, prevent the so-called overdischarge of the lithium ion battery 21. As a result, the deterioration of the lithium ion battery 21 can be alleviated, and the battery life of the lithium ion battery 21 can be extended.

The time required to complete the failure diagnosis for the main relay will now be described using a power supply system according to a comparative example that does not include the additional relay 5 or the lithium ion battery 21, unlike the power supply system 100 according to the present embodiment. The power supply system according to the comparative example has the same configuration as the power supply system 100 except that it does not include the additional relay 5 or the lithium ion battery 21. In the power supply system according to the comparative example, when the ignition switch is switched from off to on with the main relay being on, the failure diagnosis for the main relay is performed with the first load circuit and the second load circuit being electrically connected to each other. After the vehicle is started, it takes time for the circuit voltage of the first load circuit to converge to a predetermined voltage due to, for example, alternator voltage fluctuations. Therefore, the failure diagnosis for the main relay cannot be performed until the circuit voltage of the first load circuit converges to the predetermined voltage, and it takes time to start the failure diagnosis for the main relay. In other words, the power supply system according to the comparative example has a problem in that it takes time to complete the failure diagnosis for the main relay after the vehicle is started. However, in the power supply system 100 and the method for controlling the power supply system 100 of the present embodiment, when the ignition switch 68 is switched from off to on, the additional relay 5 is turned on, and accordingly, the voltage of the lithium ion battery 21 is applied to the terminal of the main relay 4. Then, in a state where the first load circuit 1 and the second load circuit 2 are electrically disconnected from each other by the additional relay 5 being turned on and then the main relay 4 being turned off, the failure diagnosis for the main relay 4 is performed. After the vehicle is started, the voltage of the lithium ion battery 21 fluctuates less than the output voltage of the alternator 14. Accordingly, the voltage applied to the main relay 4 on the second load circuit 2 side converges faster than the voltage applied to the main relay 4 on the first load circuit 1 side. Therefore, the failure diagnosis for the main relay 4 can be performed on the basis of the circuit voltage of the second load circuit 2 without waiting for the circuit voltage of the first load circuit 1 becoming stable. As in the comparative example, the failure diagnosis for the main relay 4 can be started earlier than when the failure diagnosis for the main relay is performed on the basis of the circuit voltage of the first load circuit 1. In other words, according to the power supply system 100 and the method for controlling the power supply system 100 of the present embodiment, it is possible to prevent the remaining battery level of the lithium ion battery 21 from decreasing due to dark current discharge, and to shorten the time to complete the failure diagnosis for the main relay 4.

Further, in the present embodiment, the controller 6 acquires information on the state of the main relay 4 and the state of the additional relay 5, and when the additional relay 5 is in the off state, does not output an opening control signal to the main relay 4, and when the main relay 4 is in the off state, does not output an opening control signal to the additional relay 5. This makes it possible to prevent both the main relay 4 and the additional relay 5 from being turned off and prevent the power supply to each load included in the second load circuit 2 from being interrupted. In addition, it is possible to prevent the power supply to the second load circuit 2 side from being cut off by simply monitoring the state of the main relay 4 and the state of the additional relay 5 without requiring complicated processing, making it possible to reduce a computation load on the controller 6 and improve the processing speed.

Further, in the present embodiment, the controller 6 maintains the on state of the additional relay 5 while the failure diagnosis for the main relay 4 is performed. Accordingly, an electrically-connected state is maintained between the lithium ion battery 21 and each load included in the second load circuit 2 while the failure diagnosis for the main relay 4 is performed. As a result, even when the failure diagnosis for the main relay 4 is performed with the first load circuit 1 and the second load circuit 2 being electrically disconnected from each other, it is possible to continue to supply electric power from the lithium ion battery 21 to each load included in the second load circuit 2, maintaining the circuit voltage of the second load circuit 2.

Further, in the present embodiment, when the controller 6 determines that the main relay 4 is out of order (YES in step S34 of FIG. 8), the controller 6 outputs a command to prohibit the driving mode of the vehicle from being set to the autonomous driving mode. Accordingly, it is possible to prohibit the vehicle from traveling in the autonomous driving mode in a state where the main relay 4 is out of order.

Note that the embodiment described above is described to facilitate understanding of the present invention, and is not described to limit the present invention. Therefore, the elements disclosed in the above embodiment are meant to include all design changes and equivalents that fall within the technical scope of the present invention.

In the embodiment described above, a case has been described in which when the failure diagnosis for the main relay 4 is completed and it is determined that the driving mode of the vehicle is the normal driving mode (determined to be the normal driving mode in step S6 of FIG. 7A), the on state of the additional relay 5 is maintained. However, when the controller 6 determines that the driving mode of the vehicle is the normal driving mode after the failure diagnosis for the main relay 4 is completed, the controller 6 may switch the additional relay 5 from on to off. This makes it possible, for example, to prevent the lithium ion battery 21 from being discharged to the loads connected to the lithium ion battery 21 in the parked state of the vehicle and to prevent the remaining battery level of the lithium ion battery 21 from decreasing.

Further, in the embodiment described above, a case has been described in which the failure diagnosis for the main relay 4 is performed after the ignition switch 68 is switched from off to on. However, the failure diagnosis for the main relay 4 may be performed after the ignition switch 68 is switched from on to off. For example, the controller 6 determines whether or not the ignition switch 68 has been switched from on to off, and when it is determined that the ignition switch 68 has been switched from on to off, the controller 6 may output a failure diagnosis start signal to the main relay 4. In this case, unlike step S33 in FIG. 8, the controller 6 may output the failure diagnosis start signal to the main relay 4 with the main relay 4 being turned on. This is because it may take a long time to complete the failure diagnosis for the main relay 4 after the vehicle changes to the parked state. Further, in a case where the failure diagnosis for the main relay 4 has been performed after the ignition switch 68 was switched from on to off, when the ignition switch 68 is then switched from off to on, the controller 6 determines whether or not the ignition switch 68 has been switched from off to on within a predetermined interval. Then, when the controller 6 determines that the ignition switch 68 has been switched from off to on within the predetermined interval, the controller 6 does not output a failure diagnosis start signal to the main relay 4 even when the ignition switch 68 has been switched from off to on. The predetermined interval is a period of time defined based on the specifications of the main relay 4. It is possible to prevent the failure diagnosis for the main relay 4 from being performed within a short period of time and to shorten the time from when the vehicle is started to when the vehicle starts traveling.

Further, in the embodiment described above, a case has been described in which the controller 6 switches the additional relay 5 from off to on without controlling the circuit voltage of the first load circuit 1 in step S32 of FIG. 8. However, the controller 6 may switch the additional relay 5 from off to on after controlling the circuit voltage of the first load circuit 1. For example, the controller 6 may control the alternator 14 before turning on the additional relay 5, thereby setting the circuit voltage of the first load circuit 1 to the voltage of the lithium ion battery 21. Then, the controller 6 may switch the additional relay 5 from off to on after the circuit voltage of the first load circuit 1 corresponds to the voltage of the lithium ion battery 21. This makes it possible to prevent an inrush current from flowing into the additional relay 5 due to a voltage difference between the circuit voltage of the first load circuit 1 and the voltage of the lithium ion battery 21 when the additional relay 5 is switched from off to on. As a result, a failure of the additional relay 5 can be suppressed, and the rate at which the contacts of the additional relay 5 wear out can also be reduced. Note that the controller 6 controls the alternator 14 after turning on the additional relay 5 in order to operate each load included in the first load circuit 1 according to the specifications, thereby setting the circuit voltage of the first load circuit to a voltage for the vehicle to travel.

Further, in the embodiment described above, a case has been described in which, as a failure diagnosis for the main relay 4, it is diagnosed whether or not a stuck-on condition has occurred in the main relay 4. However, the failure diagnosis for the main relay 4 may include a stuck-on failure diagnosis and a diagnosis of whether or not a stuck-off condition in which the main relay 4 is stuck in the off state has occurred (also referred to as a stuck-off failure diagnosis or an open failure diagnosis). For example, after the stuck-on failure diagnosis is completed, the controller 6 outputs a closing control signal to the main relay 4. The main relay 4 may perform the stuck-off failure diagnosis using the self-diagnosis function. For example, the main relay 4 determines, based on the detection result of the current sensor 61, whether or not a current is flowing in the direction from the first load circuit 1 side to the second load circuit side via the main relay 4. When a current is flowing from the first load circuit 1 side to the second load circuit 2 side via the main relay 4, the main relay 4 determines that a stuck-off failure has not occurred. On the other hand, when a current is not flowing from the first load circuit 1 side to the second load circuit 2 side via the main relay 4, the main relay 4 determines that a stuck-off failure has occurred. When a diagnosis result is obtained indicating that at least one of an on-stuck failure and an off-stuck failure has occurred, the controller 6 determines that the main relay 4 is out of order. On the other hand, when a diagnosis result is obtained indicating that either failure has not occurred, the controller 6 determines that the main relay 4 is not out of order.

Further, in the embodiment described above, a case has been illustrated in which the lead battery 11 is used as the main battery. However, as the main battery, a secondary battery, such as a lithium ion battery and a nickel metal hydride battery, may be used. Further, in the embodiment described above, a case has been illustrated in which the lithium ion battery 21 is used as the additional battery. However, as the additional battery, a plurality of batteries may be used, a set of a capacitor and a DC/DC converter may be used, or a nickel metal hydride battery may be used. Further, in the embodiment described above, a case has been illustrated in which the alternator 14 is used as the generator of the first load circuit 1. However, as the generator of the first load circuit, a generator, a motor generator, or the like may be used. Further, in the embodiment described above, a case has been illustrated in which the EPS actuator 22, the ABS actuator 23, and the ADAS actuator 24 are used as the loads included in the second load circuit 2. However, the loads necessary to continue the autonomous driving mode may be replaced depending on the specifications of the vehicle and the specifications of the driver assistance device. Further, in the embodiment described above, a case has been illustrated in which the additional relay 5 and the lithium ion battery 21 are not included in the second load circuit 2. However, the second load circuit 2 may include the additional relay 5 and the lithium ion battery 21. Further, in the embodiment described above, a case has been illustrated in which a semiconductor relay having the self-disconnection/connection function and the self-diagnosis function is used as the main relay 4. However, as the main relay 4, a semiconductor relay not having the self-disconnection/connection function, a semiconductor relay not having the self-diagnosis function, a semiconductor relay not having the self-disconnection/connection function or the self-diagnosis function, or a mechanical relay may be used. Note that in a case where a semiconductor relay not having the self-diagnosis function is used as the main relay 4, the failure diagnosis for the main relay 4 is performed by the controller 6. For example, the controller 6 performs the failure diagnosis for the main relay 4 in step S33 of FIG. 8. For a method for the failure diagnosis, the method described in the above-described embodiment is used. Further, in the embodiment described above, a case has been illustrated described in which a mechanical relay is used as the additional relay 5. However, as the additional relay 5, a semiconductor relay may be used.

Further, in the embodiment described above, a case has been described by way of example in which the power supply system and the method for controlling the power supply system according to the present invention are applied to a vehicle having a hands-off mode of driving assist level 2. However, the power supply system and the method for controlling the power supply system according to the present invention can also be applied to a vehicle having driving assist level 3.

Further, in the embodiment described above, a case has been described by way of example in which the power supply system and the method for controlling the power supply system according to the present invention are applied to a vehicle with an engine serving as a drive source (engine vehicle). However, the power supply system and the method for controlling the power supply system according to the present invention can be applied to a vehicle with a battery serving as a drive source (electric vehicle), a vehicle with an engine and a battery serving as drive sources (hybrid vehicle), and a vehicle with a fuel cell serving as a drive source (fuel cell vehicle). In summary, they can be applied to a vehicle in which a power supply system is installed, and the power supply system includes: a first load circuit configured to operate using electric power from a main battery, the first load circuit being connected to a first load necessary to continue a normal driving mode; a second load circuit configured to operate using electric power from an additional battery, the second load circuit being connected to a second load necessary to continue an autonomous driving mode; a first relay provided on a power supply line for electrically connecting the first load and the second load, the first relay being configured to electrically connect or disconnect the first load circuit to or from the second load circuit; a second relay configured to electrically connect or disconnect the second load to or from the additional battery; and a controller configured to determine a state of the ignition switch 68.

Further, in the embodiment described above, a control procedure has been described by way of example in which the driving mode of the vehicle is changed from the autonomous driving mode to the normal driving mode in step S11 of FIG. 7A and then the processing proceeds to step S12. However, after the process of step S11, the processing may proceed to step S13 illustrated in FIG. 7B, as with the case where it is determined in step S5 that the driving mode of the vehicle is the normal driving mode.

Further, in the embodiment described above, a case has been described in which it is determined whether or not the circuit voltage of the second load circuit 2 is outside the predetermined voltage range in step S7 of FIG. 7A and step S14 and step S16 of FIG. 7B. However, since in any of the steps, the first load circuit 1 and the second load circuit 2 are electrically connected to each other by the main relay 4, the controller 6 may determine in each step whether or not the circuit voltage of the first load circuit 1 is outside the predetermined voltage range. Further, in the embodiment described above, a case has been described in which when the circuit voltage of the second load circuit 2 is outside the predetermined voltage range in step S14 of FIG. 7B, the controller 6 switches the additional relay 5 from on to off. However, the condition for switching the additional relay 5 from on to off with the driving mode of the vehicle being the normal driving mode may be that the current flowing through the additional relay 5 is equal to or higher than a predetermined current threshold value. For example, when it is determined that the driving mode of the vehicle is the normal driving mode (determined to be the normal driving mode in step S5 of FIG. 7A), the controller 6 compares the current flowing through the additional relay 5 with the predetermined current threshold value based on the detection result from the current sensor 61. The direction of the current flowing through the additional relay 5 is not particularly limited, and the controller 6 compares the absolute value of the current flowing through the additional relay 5 with the predetermined current threshold value. The unit of the predetermined current threshold value is electric current, and the predetermined current threshold value is a current threshold value defined based on the contact life of the additional relay 5. When the absolute value of the current flowing through the additional relay 5 is equal to or higher than the predetermined current threshold value, the controller 6 outputs an opening control signal to the additional relay 5. Thus, when an excessive current flows through the additional relay 5 in the normal driving mode, the rate at which the contacts of the additional relay 5 wear out can be reduced by switching the additional relay 5 from on to off.

Further, in the embodiment described above, as the condition for the controller 6 to turn off the main relay 4 in step S7 of FIG. 7A, a condition has been described by way of example that the circuit voltage of the second load circuit 2 is outside the predetermined voltage range. However, when the circuit voltage of the second load circuit 2 is lower than the lower limit value of the predetermined voltage range or the circuit voltage of the second load circuit 2 is higher than the upper limit value of the predetermined voltage range in step S7, the controller 6 may turn off the main relay 4. Similarly, in the embodiment described above, as the condition for the controller 6 to turn off the additional relay 5 in step S14 of FIG. 7B, a condition has been described by way of example that the circuit voltage of the second load circuit 2 is outside the predetermined voltage range. However, when the circuit voltage of the second load circuit 2 is lower than the lower limit value of the predetermined voltage range or the circuit voltage of the second load circuit 2 is higher than the upper limit value of the predetermined voltage range in step S14, the controller 6 may turn off the additional relay 5.

Fourth Embodiment

Next, a fourth embodiment will be described with reference to the drawings. In the present embodiment, the configuration of a power supply system 100 and a control flow executed by a controller 6 included in the power supply system 100 are the same as those in the second embodiment, parts having the same configuration as the second embodiment are given the same reference numerals, and thus, the description thereof will be omitted while the description of the second embodiment will be used as appropriate.

The power supply system 100 according to the fourth embodiment is a power supply system installed in a vehicle that has a normal driving mode by a driver and an autonomous driving mode, and includes the first load circuit 1, the second load circuit 2, the main relay 4, the additional relay 5, and the controller 6. The first load circuit 1 operates using electric power from the lead battery 11 or the alternator 14, and is connected to the load actuator 12 and the starter motor 13 (each corresponding to the "first load") that are necessary to continue the normal driving mode. The second load circuit 2 operates using electric power from the lead battery 11 or the lithium ion battery 21, and is connected to the EPS actuator 22, the ABS actuator 23, and the ADAS actuator 24 (each corresponding to the "second load") that are necessary to continue the autonomous driving mode. The main relay 4 (corresponding to the "first relay") is provided on the power supply line 3 for electrically connecting the first load circuit 1 and the second load circuit 2 to electrically connect or disconnect the first load circuit 1 to or from the second load circuit 2. The additional relay 5 (corresponding to the "second relay") electrically connects or disconnects each load included in the second load circuit 2 to or from the lithium ion battery 21. In the present embodiment, in a case where the driving mode of the vehicle is the autonomous driving mode (determined to be the autonomous driving mode in step S4 of FIG. 6A), when the circuit voltage of the second load circuit 2 is outside the predetermined voltage range (YES in step S6 of FIG. 6A), the main relay 4 is switched from on to off. When the controller 6 determines that the driving mode of the vehicle is the normal driving mode (determined to be the normal driving mode in step S4 of FIG. 6A), the controller 6 maintains the on state of the main relay 4 regardless of the circuit voltage of the second load circuit 2 (step S3 of FIG. 6A and step S14 of FIG. 6B).

For example, the method for controlling an autonomous vehicle power supply described in Patent Document 1 has a problem that the additional battery is discharged by a dark current of the load because the additional battery cannot be disconnected from the load. A problem to be solved by the present embodiment is to provide a power supply system and a method for controlling the power supply system to prevent an additional battery from being discharged by a dark current of a load. The power supply system 100 according to the present embodiment can solve the problem by the above-described means, and the second relay can electrically disconnect the load from the additional battery, making it possible to prevent the additional battery from being discharged by the dark current of the load.

Since the additional relay 5 can electrically disconnect each load included in the second load circuit 2 from the lithium ion battery 21, it is possible to prevent the lithium ion battery 21 from being discharged by a dark current of the load and prevent the remaining battery level of the lithium ion battery 21 from decreasing while the vehicle is in the parked state. As a result, even when a situation occurs in which the main relay 4 is turned off in a state where the vehicle can travel in the autonomous driving mode, the lithium ion battery 21 can supply electric power to continue autonomous travel to each load included in the second load circuit 2. Further, it is possible to prevent the lithium ion battery 21 from continuing to discharge in a state where it is an end-of-discharge voltage or lower, that is, prevent the so-called overdischarge of the lithium ion battery 21. As a result, the deterioration of the lithium ion battery 21 can be alleviated, and the battery life of the lithium ion battery 21 can be extended. In addition, there are concerns about the additional relay 5 being provided that a surge voltage may be generated when the additional relay 5 is switched from on to off in the normal driving mode, and the main relay 4 may be switched from on to off due to the surge voltage. However, in the power supply system 100 and the method for controlling the power supply system 100 of the present embodiment, since the main relay 4 maintains the on state in the normal driving mode, the main relay 4 can be prevented from being switched from on to off due to the surge voltage. This makes it possible for each load included in the second load circuit 2 to continue to be supplied with the electric power from the first load circuit 1 side, maintaining the circuit voltage of the second load circuit 2. In other words, according to the power supply system 100 and the method for controlling the power supply system 100 of the present embodiment, it is possible to prevent the remaining battery level of the lithium ion battery 21 from decreasing due to dark current discharge, and to maintain the circuit voltage of the second load circuit 2 at the voltage from the first load circuit 1 side.

Further, in the present embodiment, when the controller 6 determines that the driving mode of the vehicle is the normal driving mode (determined to be the normal driving mode in step S4 of FIG. 6A), the controller 6 outputs a connection maintaining command to the main relay 4 to maintain the on state (step S12 of FIG. 6B). Thus, since the main relay 4 can maintain the on state in the normal driving mode, the electrically-connected state is maintained between the first load circuit 1 and the second load circuit 2. As a result, in the normal driving mode, the main relay 4 can be prevented from being switched from on to off due to external factors such as a surge voltage.

Further, in the present embodiment, the connection maintaining command output to the main relay 4 is a command to maintain the on state of the main relay 4 regardless of the circuit voltage of the second load circuit 2 and the switching from on to off of the additional relay 5 (step S12 of FIG. 6B). As a result, even when a signal corresponding to an opening control signal is input to the main relay 4 due to the circuit voltage of the second load circuit 2 or the switching from on to off of the additional relay 5, the main relay 4 can maintain the on state.

Further, in the present embodiment, when the controller 6 determines that the driving mode of the vehicle is the autonomous driving mode (determined to be the autonomous driving mode in step S4 of FIG. 6A), the controller 6 outputs a cancellation command to the main relay 4 to cancel the connection maintaining command (step S5 of FIG. 6A). This makes it possible to control on and off of the main relay 4 using the opening/closing control signal in the autonomous driving mode. As a result, as in the present embodiment, when the controller 6 determines that the circuit voltage of the second load circuit 2 is outside the predetermined voltage range in the autonomous driving mode, the controller 6 can turn off the main relay 4 (step S8 of FIG. 6A).

Further, in the present embodiment, the main relay 4 has a self-disconnection/connection function that switches from on to off when the circuit voltage of the second load circuit 2 becomes an abnormal voltage, the connection maintaining command is a command to disable the self-disconnection/connection function of the main relay 4, and the cancellation command is a command to enable the self-disconnection/connection function of the main relay 4. The main relay 4 can be switched from on to off earlier than when the main relay 4 is switched from on to off by the opening control signal of the controller 6, and the circuits included in the second load circuit 2 can be protected better when an abnormal voltage is generated.

Further, in the present embodiment, in a case where the controller 6 determines that the driving mode of the vehicle is the normal driving mode (determined to be the autonomous normal driving mode in step S4 of FIG. 6A), when the circuit voltage of the second load circuit 2 is outside the predetermined voltage range, the controller 6 turns off the additional relay 5 (step S14 of FIG. 6B). Since the main relay 4 maintains the on state, the circuit voltage of the second load circuit 2 can be stabilized even if a surge voltage occurs when the additional relay 5 is switched from on to off. As a result, it is possible to protect each load included in the second load circuit 2.

Further, in the present embodiment, the controller 6 determines whether or not the vehicle is in the parked state, and when it is determined that the vehicle is in the parked state, the controller 6 turns off the additional relay 5. This has the same effects as those described above. Further, since the lithium ion battery 21 and each load included in the second load circuit 2 are electrically disconnected from each other in the parked state of the vehicle, it is possible to prevent the lithium ion battery 21 from being discharged by a dark current of the load. Accordingly, it is possible to prevent the remaining battery level of the lithium ion battery 21 from decreasing due to dark current discharge, so that each load included in the second load circuit 2 can operate using the electric power from the lithium ion battery 21 according to the specifications.

Further, in the present embodiment, the controller 6 acquires information on the state of the main relay 4 and the state of the additional relay 5, does not output an opening control signal to the main relay 4 when the additional relay 5 is in the off state, and does not output an opening control signal to the additional relay 5 when the main relay 4 is in the off state. This makes it possible to prevent both the main relay 4 and the additional relay 5 from being turned off and prevent the power supply to each load included in the second load circuit 2 from being interrupted. In addition, it is possible to prevent the power supply to the second load circuit 2 side from being cut off by simply monitoring the state of the main relay 4 and the state of the additional relay 5 without requiring complicated processing, making it possible to reduce a computation load on the controller 6 and improve the processing speed.

In the embodiment described above, a case has been illustrates in which in a case where the controller 6 determines that the driving mode of the vehicle is the normal driving mode, when the circuit voltage of the second load circuit 2 is outside the predetermined voltage range, the controller 6 turns off the additional relay 5, and in a case where the controller 6 also determines that the vehicle is in the parked state, the controller 6 turns off the additional relay 5. However, when a current equal to or higher than a predetermined current value is flowing to the lithium ion battery 21 via the additional relay 5, the controller 6 may not turn off the additional relay 5. The predetermined current value is a current preset based on a surge voltage generated by the switching of the additional relay 5 from on to off. For example, in step S14 of FIG. 6B, the controller 6 acquires information on the current flowing through the additional relay 5 from a current sensor (not illustrated) connected in series to the additional relay 5. Then, when the current flowing to the lithium ion battery 21 via the additional relay 5 is equal to or higher than the predetermined current value, the controller 6 does not output an opening control signal to the additional relay 5 even when the circuit voltage of the second load circuit 2 is outside the predetermined voltage range. Further, for example, even if the controller 6 determines that the vehicle is in the parked state, when the current flowing to the lithium ion battery 21 via the additional relay 5 is equal to or higher than the predetermined current value, the controller 6 does not output an opening control signal to the additional relay 5 even when the vehicle is in the parked state. This makes it possible to prevent a surge voltage from being generated because the higher the current value of the current flowing through the additional relay 5 is, the more a surge voltage is likely to be generated when the additional relay 5 is switched from on to off.

Further, in the embodiment described above, a case has been illustrated in which the lead battery 11 is used as the main battery. However, as the main battery, a secondary battery such as a lithium ion battery and a nickel metal hydride battery may be used. Further, in the embodiment described above, a case has been illustrated in which the lithium ion battery 21 is used as the additional battery. However, as the additional battery, a plurality of batteries may be used, a set of a capacitor and a DC/DC converter may be used, or a nickel metal hydride battery may be used. Further, in the embodiment described above, a case has been illustrated in which the alternator 14 is used as the generator of the first load circuit 1. However, as the generator of the first load circuit 1, a generator, a motor generator, or the like may be used. Further, in the embodiment described above, a case has been illustrated in which the EPS actuator 22, the ABS actuator 23, and the ADAS actuator 24 are used as the loads included in the second load circuit 2. However, the loads necessary to continue the autonomous driving mode may be replaced depending on the specifications of the vehicle and the specifications of the driver assistance device. Further, in the embodiment described above, a case has been illustrated in which the additional relay 5 and the lithium ion battery 21 are not included in the second load circuit 2. However, the second load circuit 2 may include the additional relay 5 and the lithium ion battery 21. Further, in the embodiment described above, a case has been illustrated in which a semiconductor relay having the self-disconnection/connection function is used as the main relay 4. However, as the main relay 4, a semiconductor relay not having the self-disconnection/connection function, or a mechanical relay may be used. Further, in the embodiment described above, a case has been illustrated in which a mechanical relay is used as the additional relay 5. However, as the additional relay 5, a semiconductor relay may be used.

Further, in the embodiment described above, a case has been described by way of example in which the power supply system and the method for controlling the power supply system according to the present invention are applied to a vehicle having a hands-off mode of driving assist level 2. However, the power supply system and the method for controlling the power supply system according to the present invention can also be applied to a vehicle having driving assist level 3.

Further, in the embodiment described above, a case has been described by way of example in which the power supply system and the method for controlling the power supply system according to the present invention are applied to a vehicle with an engine serving as a drive source (engine vehicle). However, the power supply system and the method for controlling the power supply system according to the present invention can also be applied to a vehicle with a battery serving as a drive source (electric vehicle), a vehicle with an engine and a battery serving as drive sources (hybrid vehicle), and a vehicle with a fuel cell serving as a drive source (fuel cell vehicle). In summary, they can be applied to a vehicle in which a power supply system is installed, and the power supply system includes: a first load circuit configured to operate using electric power from a main battery, the first load circuit being connected to a first load necessary to continue a normal driving mode; a second load circuit configured to operate using electric power from an additional battery, the second load circuit being connected to a second load necessary to continue an autonomous driving mode; a first relay provided on a power supply line for electrically connecting the first load and the second load, the first relay being configured to electrically connect or disconnect the first load circuit to or from the second load circuit; a second relay configured to electrically connect or disconnect the second load to or from the additional battery; and a controller configured to determine a driving mode of the vehicle.

Further, in the embodiment described above, a control procedure has been described by way of example in which the driving mode of the vehicle is changed from the autonomous driving mode to the normal driving mode in step S10 of FIG. 6A and then the processing proceeds to step S11. However, after the process of step S10, the processing may proceed to step S12 illustrated in FIG. 6B, as in the case where it is determined in step S4 that the driving mode of the vehicle is the normal driving mode.

Further, in the embodiment described above, a case has been described in which it is determined whether or not the circuit voltage of the second load circuit 2 is outside the predetermined voltage range in step S6 of FIG. 6A and step S13 and step S15 of FIG. 6B. However, since in any of the steps, the first load circuit 1 and the second load circuit 2 are electrically connected to each other by the main relay 4, the controller 6 may determine in each step whether or not the circuit voltage of the first load circuit 1 is outside the predetermined voltage range. Further, in the embodiment described above, a case has been described in which when the circuit voltage of the second load circuit 2 is outside the predetermined voltage range in step S13 of FIG. 6B, the controller 6 switches the additional relay 5 from on to off. However, the condition for switching the additional relay 5 from on to off with the driving mode of the vehicle being the normal driving mode may be that the current flowing through the additional relay 5 is equal to or higher than a predetermined current threshold value. For example, when it is determined that the driving mode of the vehicle is the normal driving mode (determined to be the normal driving mode in step S4 of FIG. 6A), the controller 6 compares the current flowing through the additional relay 5 with the predetermined current threshold value based on the detection result from the current sensor 61. The direction of the current flowing through the additional relay 5 is not particularly limited, and the controller 6 compares the absolute value of the current flowing through the additional relay 5 with the predetermined current threshold value. The unit of the predetermined current threshold value is electric current, and the predetermined current threshold value is a current threshold value defined based on the contact life of the additional relay 5. When the absolute value of the current flowing through the additional relay 5 is equal to or higher than the predetermined current threshold value, the controller 6 outputs an opening control signal to the additional relay 5. Thus, when an excessive current flows through the additional relay 5 in the normal driving mode, the rate at which the contacts of the additional relay 5 wear out can be reduced by switching the additional relay 5 from on to off.

Further, in the embodiment described above, as the condition for the controller 6 to turn off the main relay 4 in step S6 of FIG. 6A, a condition has been described by way of example that the circuit voltage of the second load circuit 2 is outside the predetermined voltage range. However, when the circuit voltage of the second load circuit 2 is lower than the lower limit value of the predetermined voltage range or the circuit voltage of the second load circuit 2 is higher than the upper limit value of the predetermined voltage range in step S6, the controller 6 may turn off the main relay 4. Similarly, in the embodiment described above, as the condition for the controller 6 to turn off the additional relay 5 in step S13 of FIG. 6B, a condition has been described by way of example that the circuit voltage of the second load circuit 2 is outside the predetermined voltage range. However, when the circuit voltage of the second load circuit 2 is lower than the lower limit value of the predetermined voltage range or the circuit voltage of the second load circuit 2 is higher than the upper limit value of the predetermined voltage range in step S13, the controller 6 may turn off the additional relay 5.

While the embodiments of the present invention have been described above, these embodiments have been described to facilitate understanding of the present invention, and have not been described to limit the present invention. Therefore, the elements disclosed in the above embodiments are meant to include all design changes and equivalents that fall within the technical scope of the present invention.

DESCRIPTION OF REFERENCE NUMERALS

1 First load circuit
11 Lead battery
12 Load actuator
13 Starter motor
14 Alternator
2 Second load circuit
21 Lithium ion battery
22 EPS actuator
23 ABS actuator
24 ADAS actuator
3 Power supply line
4 Main relay
5 Additional relay
6 Controller
100 Power supply system

The invention claimed is:

1. A power supply system installed in a vehicle having an autonomous driving mode, the power supply system comprising:
   a first load circuit connected to a first load that operates using electric power from a main battery;
   a second load circuit connected to a second load that operates using electric power from the main battery or an additional battery and that is necessary to continue the autonomous driving mode;
   a main relay provided on a power supply line for electrically connecting the first load and the second load, the main relay configured to electrically connect or disconnect the first load circuit to or from the second load circuit,
   an additional relay; and
   a controller configured to perform opening/closing control of the main relay and the additional relay, wherein the first load circuit is located on an upstream side of the main relay,
   wherein a branch point on a downstream side of the main relay defines a first path and a second path and allows a current flowing from the first load circuit to the main relay to flow from the branch point to the second load by the first path and to the additional battery by the second path,
   wherein a current value allowed for conduction through the first path is higher than a current value allowed for conduction through the second path,
   wherein the additional relay is connected to the second path, and
   wherein the controller is configured to:
      determine whether a driving mode of the vehicle is the autonomous driving mode or a normal driving mode;
      when determining that the driving mode of the vehicle is the autonomous driving mode, determine whether a circuit voltage of the second load circuit is outside a predetermined voltage range;
      when determining that the circuit voltage of the second load circuit is outside the predetermined voltage range, transmit an opening control signal to the main relay and a closing control signal to the additional relay to cut off power supply from the main battery to the second load and to supply power from the additional battery to the second load; and
      when determining that the circuit voltage of the second load circuit is not outside the predetermined voltage range, transmit the closing control signal to the main relay and the additional relay.

2. The power supply system according to claim 1, wherein the branch point is located closer to the main relay than to the additional battery on a wire for connecting the main relay and the additional battery.

3. The power supply system according to claim 1, further comprising:
   a relay module in which branch wires including the branch point and the main relay are modularized.

4. The power supply system according to claim 3, wherein the relay module includes a switch connected between the first path and the second path.

5. The power supply system according to claim 1, wherein the second load is a load necessary for the vehicle to travel in the autonomous driving mode.

6. The power supply system according to claim 1, wherein the additional relay includes a DC/DC converter.

7. The power supply system according to claim 1, wherein:
   the second load circuit includes the second load that consumes a large current and a small-current consuming load that consumes a small current, and
   the small-current consuming load is connected to the second path.

8. The power supply system according to claim 1, wherein the controller is configured to:
   when determining that the driving mode of the vehicle is the autonomous driving mode, sending connection maintaining command for maintaining the on state regardless of whether an opening/closing control signal is received to the additional relay.

* * * * *